Nov. 3, 1931.  E. J. VON PEIN  1,829,817
CASH REGISTER
Filed July 3, 1924   13 Sheets-Sheet 1

Inventor
EDWARD J. VON PEIN
By
His Attorneys

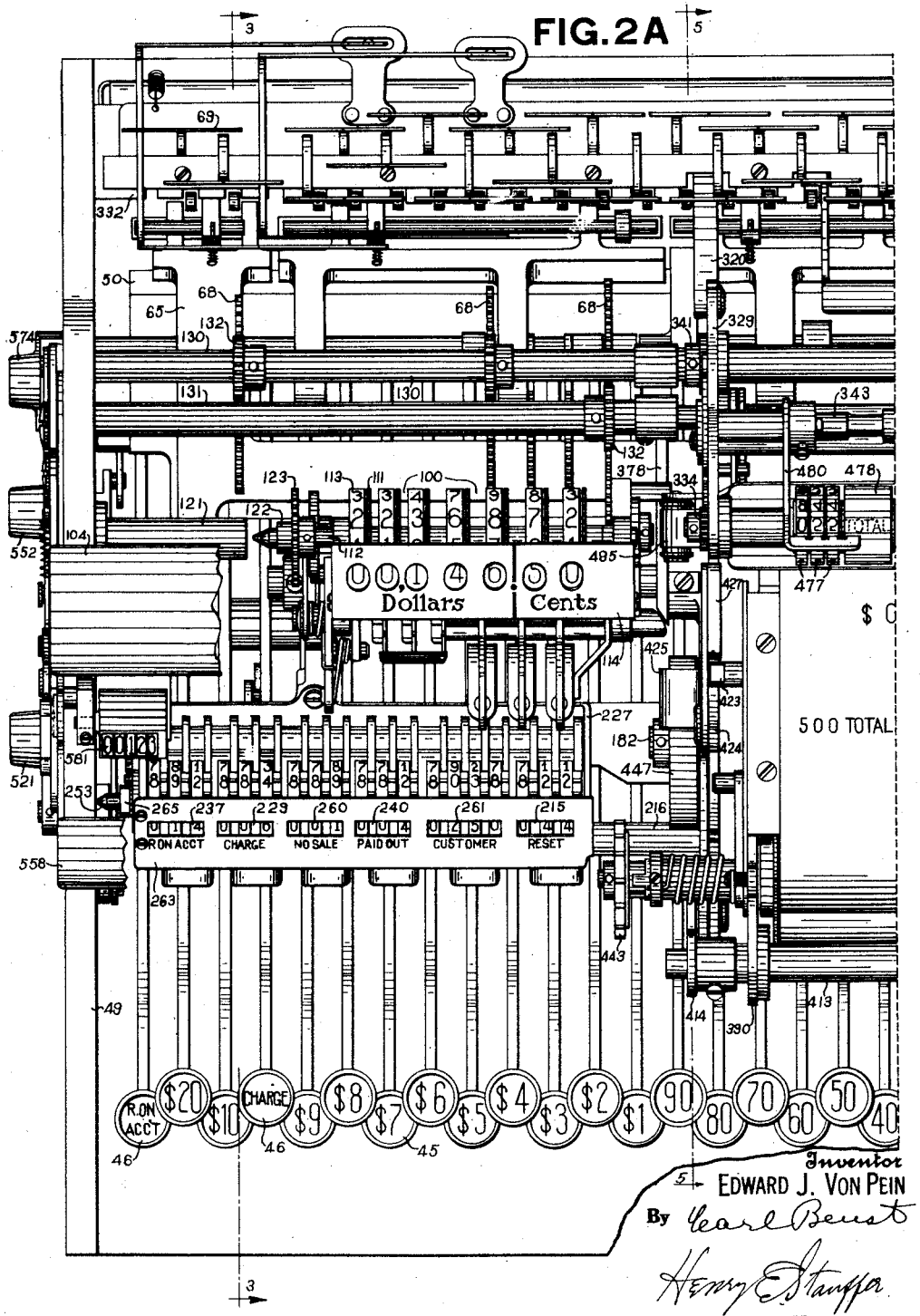

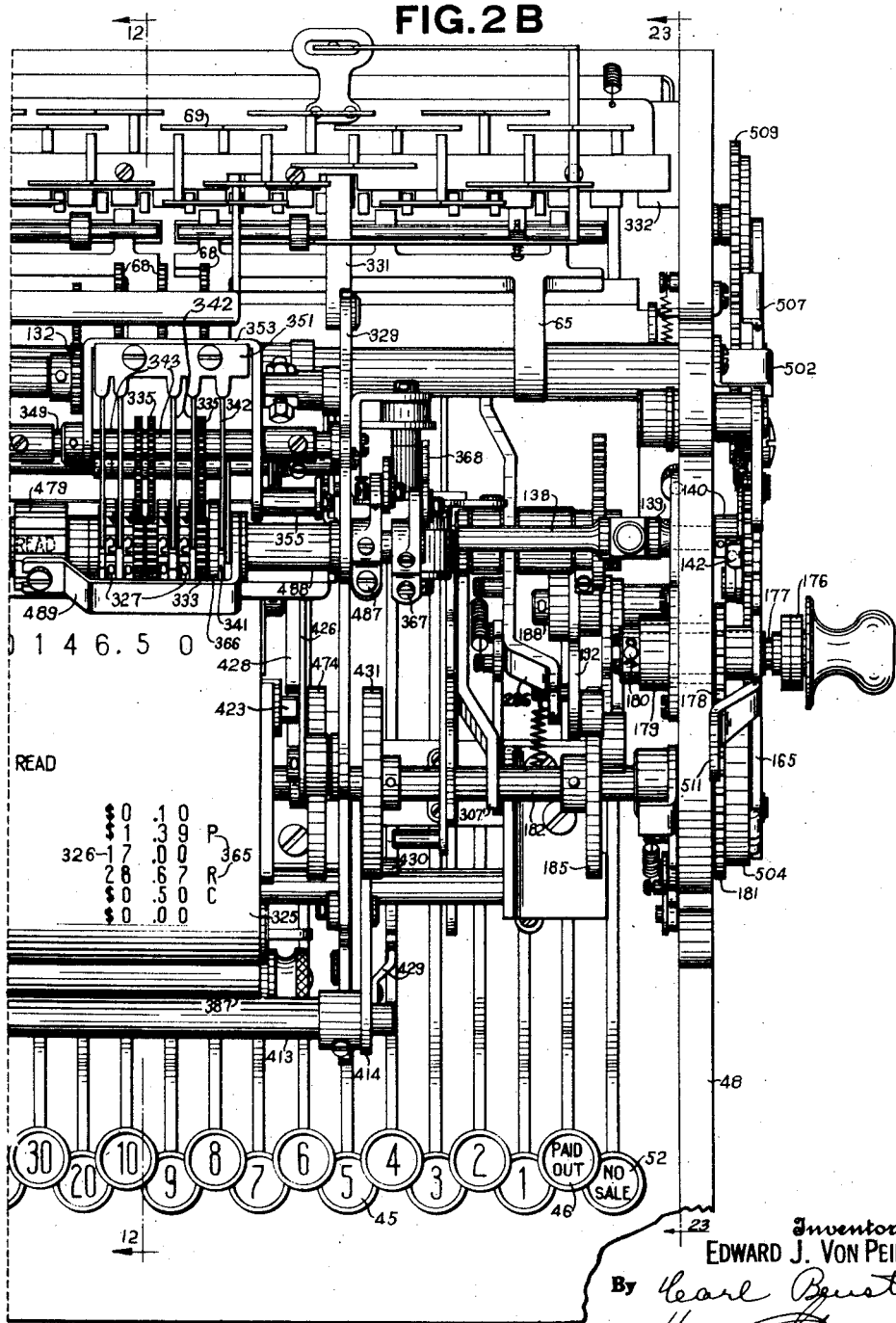

Nov. 3, 1931.  E. J. VON PEIN  1,829,817
CASH REGISTER
Filed July 3, 1924    13 Sheets-Sheet 4
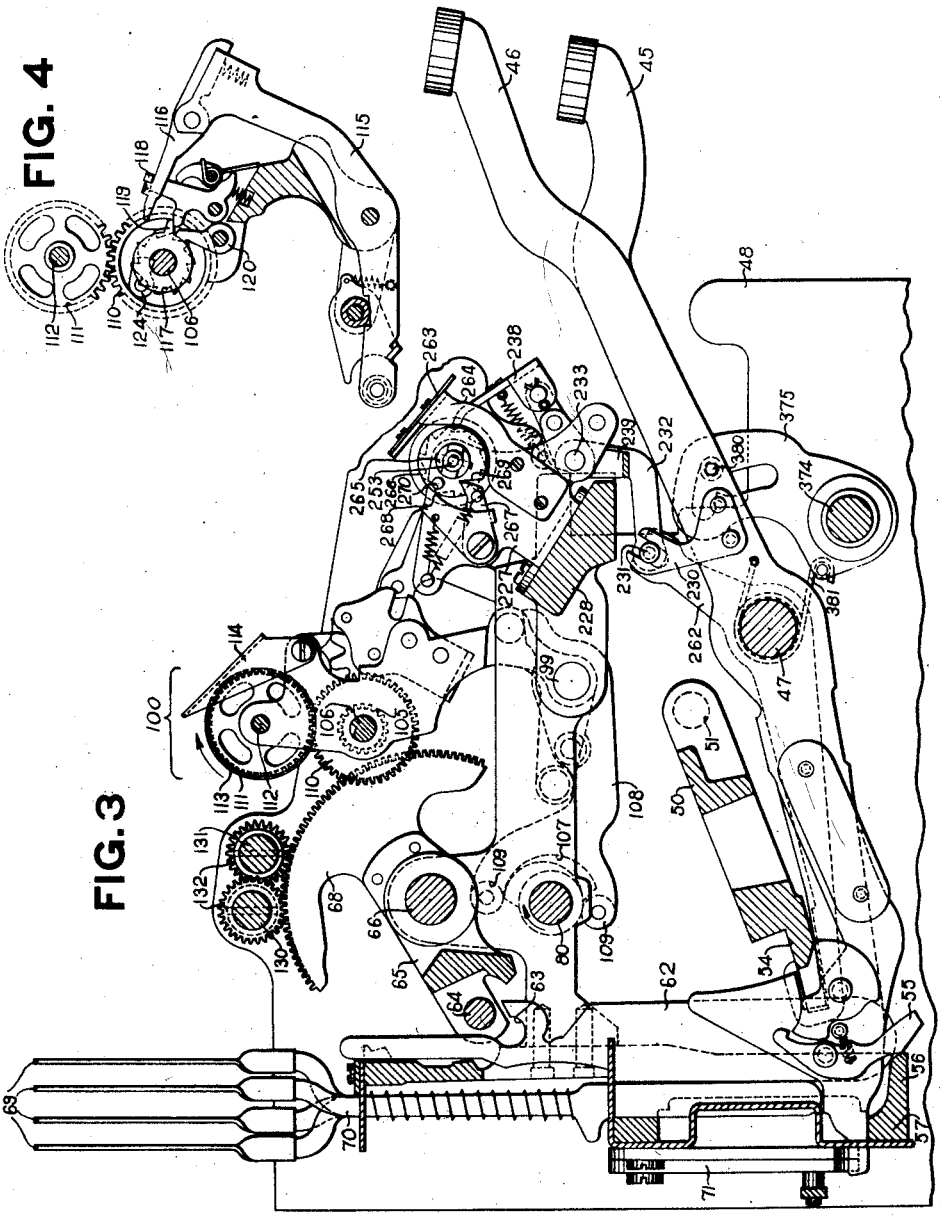
Inventor
EDWARD J. VON PEIN
By Carl Beust
Henry E. Stauffer
His Attorneys Nov. 3, 1931.  E. J. VON PEIN  1,829,817
CASH REGISTER
Filed July 3, 1924  13 Sheets-Sheet 5
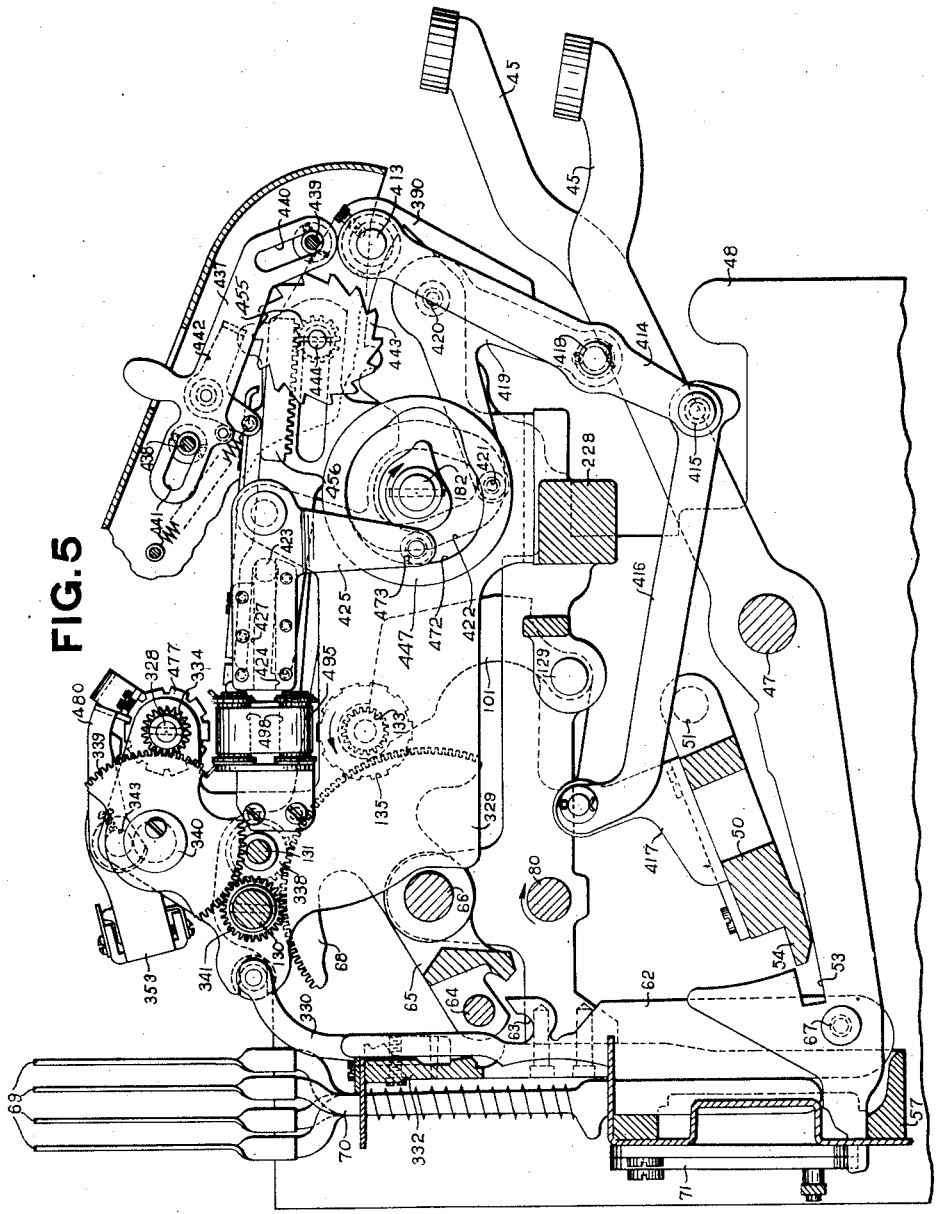
Inventor
EDWARD J. VON PEIN
By Carl Beust
Henry E. Stauffer
His Attorneys Nov. 3, 1931.  E. J. VON PEIN  1,829,817
CASH REGISTER
Filed July 3, 1924  13 Sheets-Sheet 6

Inventor
EDWARD J. VON PEIN
By
His Attorneys

Nov. 3, 1931.   E. J. VON PEIN   1,829,817
CASH REGISTER
Filed July 3 1924   13 Sheets-Sheet 7

Inventor
EDWARD J. VON PEIN
By
His Attorneys

Nov. 3, 1931.  E. J. VON PEIN  1,829,817
CASH REGISTER
Filed July 3, 1924  13 Sheets-Sheet 8

Inventor
EDWARD J. VON PEIN
By
His Attorneys

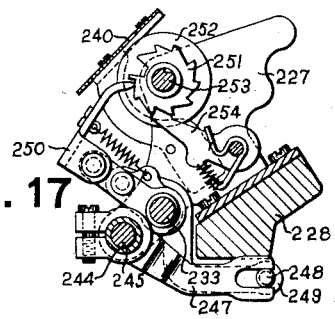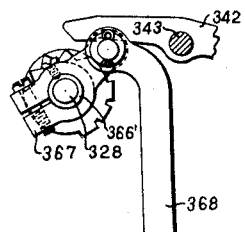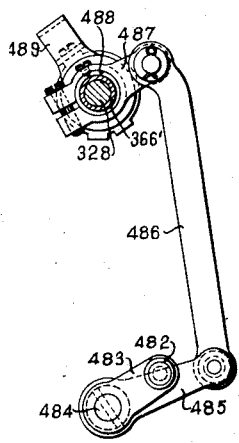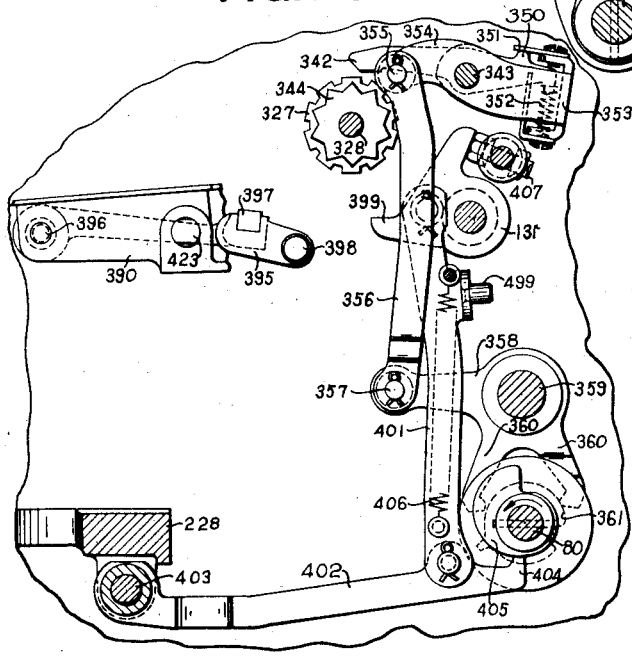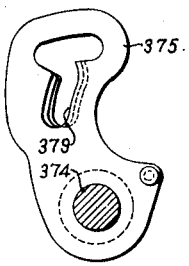

Nov. 3, 1931.  E. J. VON PEIN  1,829,817
CASH REGISTER
Filed July 3, 1924   13 Sheets-Sheet 10

Inventor
EDWARD J. VON PEIN
By
His Attorneys

Nov. 3, 1931.  E. J. VON PEIN  1,829,817
CASH REGISTER
Filed July 3, 1924 13 Sheets-Sheet 11
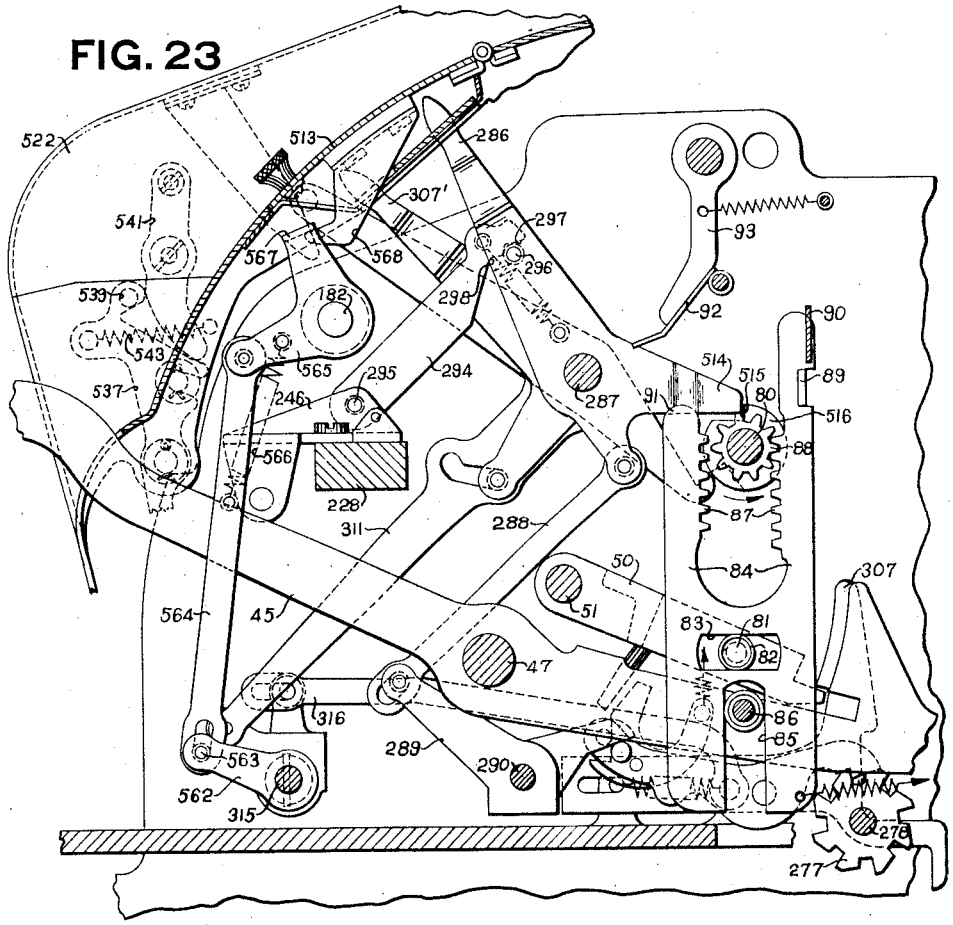
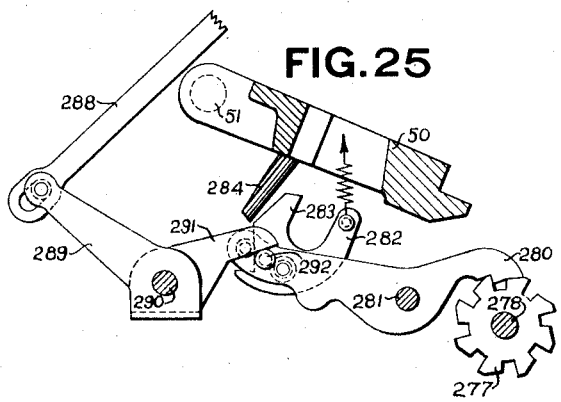
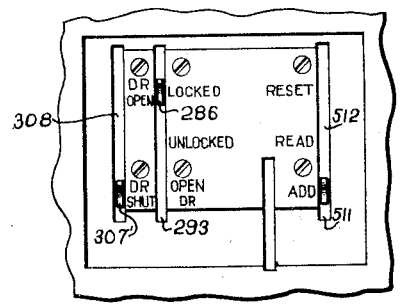
Inventor
EDWARD J. VON PEIN
By
His Attorneys Nov. 3, 1931. E. J. VON PEIN 1,829,817
CASH REGISTER
Filed July 3, 1924 13 Sheets-Sheet 12
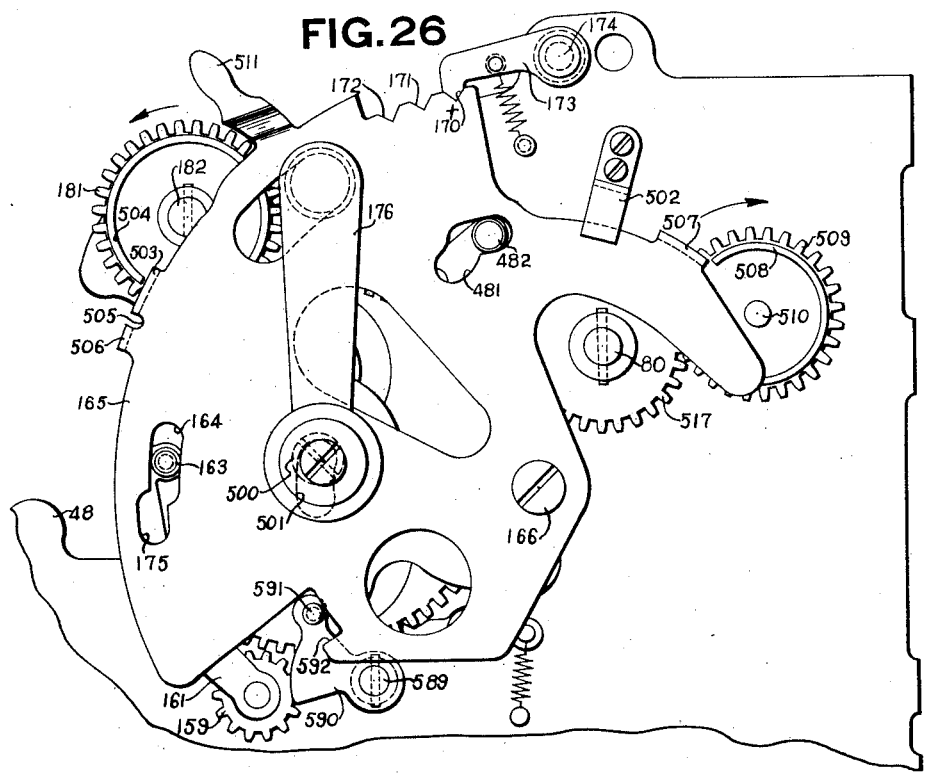
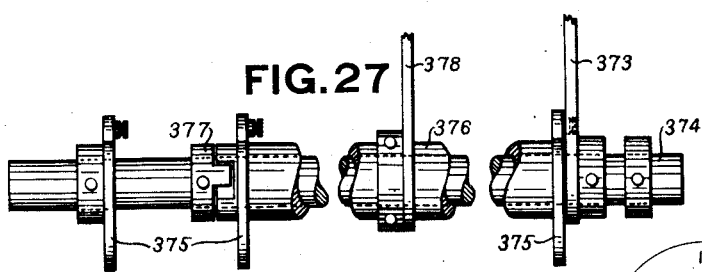
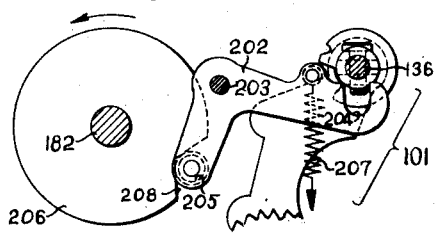
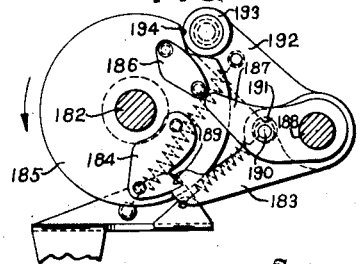
Inventor
EDWARD J. VON PEIN
His Attorneys Nov. 3, 1931.  E. J. VON PEIN  1,829,817
CASH REGISTER
Filed July 3, 1924  13 Sheets-Sheet 13

Inventor
EDWARD J. VON PEIN
By
His Attorneys

Patented Nov. 3, 1931

1,829,817

UNITED STATES PATENT OFFICE

EDWARD J. VON PEIN, OF DAYTON, OHIO, ASSIGNOR, BY MESNE ASSIGNMENTS, TO THE NATIONAL CASH REGISTER COMPANY, OF DAYTON, OHIO, A CORPORATION OF MARYLAND

CASH REGISTER

Application filed July 3, 1924. Serial No. 724,093.

This invention relates to cash registers, and more particularly to cash registers of the type described in patents to Carney, Nos. 497,860 and 699,100, issued May 23, 1893 and April 29, 1902, respectively, to which reference may be had for a general description of the operation and construction of the machine.

An object of this invention is the provision of item type wheels for printing the items of each transaction, and an accumulator including type wheels for printing the accumulated total of the items printed.

Another object of the invention is to provide operating means independent of the transaction keys for operating the printing mechanism to print sub-totals and totals, and to automatically reset the totalizer after printing the total.

Another object is to provide a plurality of locking means for controlling the various operations of the machine, it being desirable for the proprietor to have access to all the controls of the machine, the manager to a limited number of controls, and the clerk to the necessary controls to properly operate the machine.

Another object is to provide a suitable printing mechanism conveniently located for writing on the record strip and to display the last printed record.

With these and incidental objects in view, the invention includes certain novel features of construction and combinations of parts, the essential elements of which are set forth in appended claims and a preferred form or embodiment of which is hereinafter described with reference to the drawings which accompany and form part of this specification.

Of said drawings:

Fig. 1 is a perspective view of the machine.

Figs. 2A and 2B taken together constitute a top plan view of the machine with the cabinet removed.

Fig. 3 is a transverse sectional view taken on the line 3—3 of Fig. 2A looking in the direction of the arrows, with parts omitted for clearness.

Fig. 4 is a detail sectional view of the recording totalizer.

Fig. 5 is a transverse sectional view taken substantially on the line 5—5 of Fig. 2A looking in the direction of the arrows.

Fig. 16 is a detail front elevational view of a portion of the "Paid out" counter.

Fig. 17 is a detail right hand end view of the "Paid out" counter.

Fig. 18 is a detail view of the "Paid out" counter and special transaction type wheel operating mechanism.

Fig. 19 is a detail right hand side elevation of the special transaction counters and type wheel operating cams.

Fig. 20 is a detail view showing the item type wheel alining mechanism and the impression hammer operating mechanism.

Fig. 21 is a detail view of the totalizing type wheel operating mechanism.

Fig. 23 is a transverse sectional view taken on the line 23—23 of Fig. 2B.

Fig. 24 is a detail view of the index plate for the register control levers.

Fig. 25 is a detail view of the cash drawer release mechanism.

Fig. 26 is a right hand end elevation of the machine, showing the controlling lever.

Fig. 27 is a detail view of the transaction key cam line.

Fig. 28 is a detail right hand end view of the operating handle arresting mechanism.

Fig. 29 is a detail view of mechanism for locking the totalizer in home position during total printing operations.

In general

The machine in general includes a plurality of groups of depressible amount keys, the usual special transaction keys, indicators adapted to display the transaction, totalizers adapted to accumulate amounts, and a printing mechanism.

Each item is printed upon a record strip by printing wheels operated by the depressible keys. Cash and received on account items are entered in a printing sub-totalizer and also in a reading grand totalizer. A printed statement may be had from the sub-totalizer at any time by operating a mechanism independent of the depressible keys. If desired this totalizer can be automatically reset to zero after printing the statement by positioning a control lever prior to operating the machine. The grand totalizer is reset to zero in the usual way by an insertable key.

Figures 6, 7:
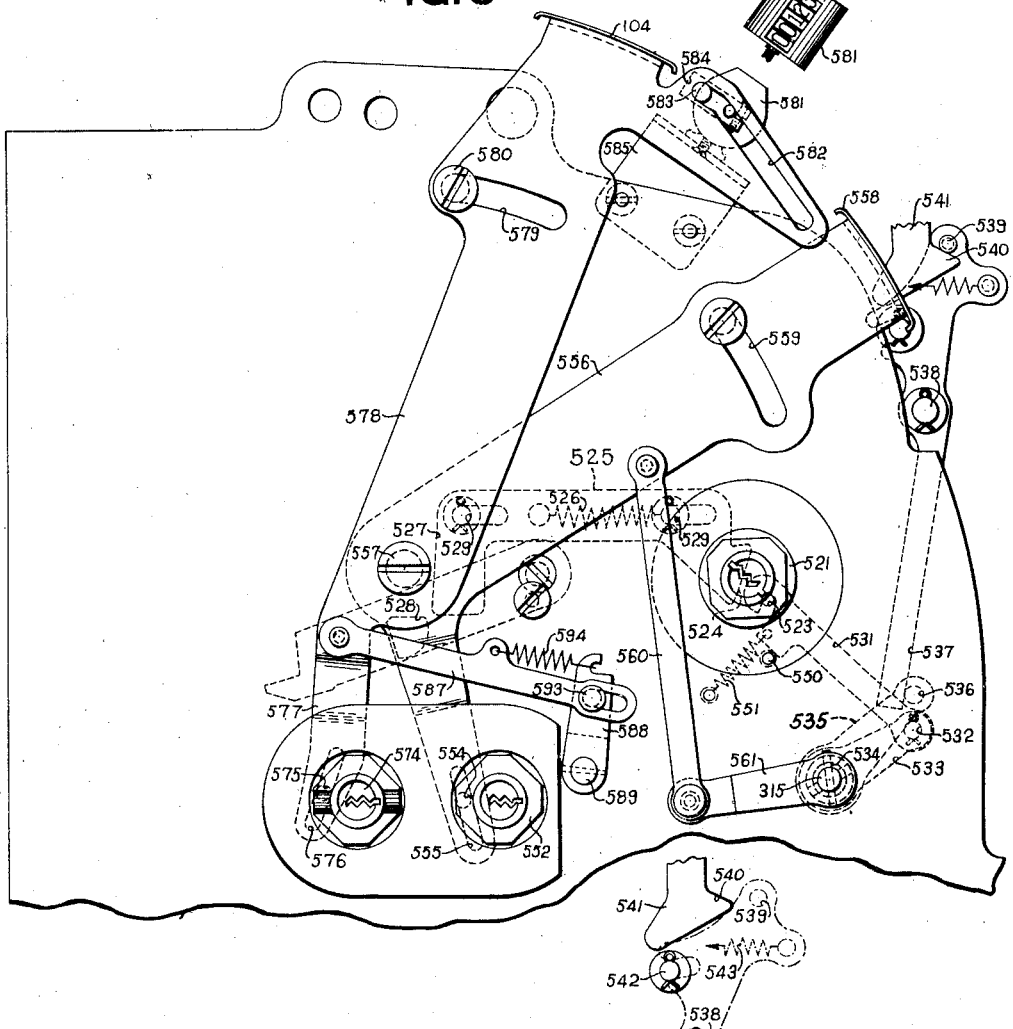
Fig. 6 is an elevational view of the left hand end of the machine, showing the key locking mechanism.
Fig. 7 is a detail top plan view of the counter shown in Fig. 6.

Access to the various controlling means, grand totalizer, counters and printing mechanism is controlled by three locks placed on the left hand end of the machine (Fig. 6). These locks may be designated Nos. 1, 2 and 3. The No. 1 key operates the No. 1 lock 521, which controls the operation of the depressible keys and also permits opening a part of the casing to give access to the printing mechanism for the purpose of installing a new record strip supply roll. This key may be in the possession of a clerk. The No. 2 key, which is intended to be in the possession of the store manager, operates both the No. 1 and No. 2 locks. The No. 2 lock 552 controls access to the reading of the special counters and to the various levers controlling the operation of the machine with the cash drawer open or closed, the locking of the machine so that the clerk can not operate it, the opening of the cash drawer without operating the depressible keys, and the reading of the printing sub-totalizer. The No. 3 key, which is in the possession of the proprietor, operates locks Nos. 1, 2 and 3. No. 3 lock 574 controls access to the reading grand totalizer, operates a counting device, and permits reading and resetting the printing sub-totalizer.

Keyboard

Described in detail, the machine includes groups of amount keys 45, special transaction keys 46, and a "No sale" key 52. All of the keys are pivotally mounted upon a transverse rod 47 (Figs. 3 and 5) supported in the side frames 48 and 49. Common to all of the keys 45, 46 and 52 is a key coupler 50 (Figs. 3, 5 and 23) of a form well known in the art and fully described in the aforesaid Carney patents. The key coupler 50 is pivoted at 51 at each end in the side frames 48 and 49, and normally rests on the rear ends of the amount keys 45 and the "No sale" key 52. Each of the amount keys and the "No sale" key is provided with a notch 53 adapted to cooperate with a lip 54 formed on the rear edge of the key coupler when any of these keys is depressed.

The special transaction keys 46 (Fig. 3) are so constructed as to be given an initial movement before engaging the key coupler prior to the operation of an amount key. During the initial movement of a special key, a spring-actuated pawl 55, pivoted on the rear end of the key, engages a ledge 56 of a transverse bar 57, of the frame of the machine, to support the key in its initial position until the key coupler, operated by an amount key, operates the special transaction key to its full extent of movement, all of which is well known in the art and is described in detail in Letters Patent to Von Pein, No. 1,371,653, issued March 15, 1921.

Pivotally mounted on the rear end of each amount key is a totalizer actuator controller 62 (Fig. 5) having a notch 63 adapted to engage a rod 64 supported in a rockable frame 65 pivotally mounted on a rod 66 supported in the side frames of the machine. The notches 63 on the controllers 62 are located different distances from the pivotal point 67 for the different amount keys so as to give a differential movement to the frame 65. Secured to the rockable frame 65 is a gear segment actuator 68 which is the actuating means for both the totalizers and printing wheels, which will hereinafter be described.

Target indicators 69 (Figs. 3 and 5), fastened on vertical rods 70 resting upon the rear ends of the keys, indicate the transaction as it is registered, all of which is well known in the art. The usual key stops 71 are provided across the back of the machine to prevent depressing more than one key of each group.

Suitably mounted in the side frames 48 and 49 is a transverse rotating shaft 80 which is adapted to be given a complete rotation upon each operation of the key coupler 50 by the mechanism shown in Fig. 23. The right hand end of the coupler 50 is provided with a stud 81 carrying a roller 82 projecting into an elongated slot 83 formed in a vertical reciprocable double rack 84. At its lower end the double rack 84 is provided with an open slot 85 which straddles a roller on a stud 86 supported in the right hand side frame 48. At its upper end the rack 84 is also slotted, and the inside walls of the slot are furnished with oppositely faced rack teeth 87 which cooperate with a pinion 88 fast on the rotating shaft 80. As the key coupler 50 is moved counter-clockwise by the keys 45 (Fig. 23), an ear 89 projecting laterally from the double rack 84 passes to the front of a flange 90 projecting from the right hand side frame and retains the right hand rack teeth 87 in mesh with the pinion 88, as the rack 84 rises causing the shaft 80 to rotate in the direction of the arrow. When the key coupler has reached its highest position, the ear 89 will have passed above the flange 90 and the upper end 91 of the left hand rack, engaging a flange 92 on a spring-pulled arm 93, will cause the double rack 84 to swing clockwise around the stud 86 engaging the forward rack teeth 87 with the pinion 88 and simultaneously disengaging the rear rack teeth from said pinion, in which position the ear 89 will be to the rear of the flange 90. As the key coupler returns to its normal position, the forward rack teeth 87 will be held in mesh with the pinion 88 by the ear 89 passing to the rear of the flange 90. The return movement of the key coupler and rack 84 causes the shaft 80 to continue its rotation in the direction of the arrow, making one complete rotation.

Grand totalizer

When an amount key is depressed, the amount represented by this key is entered into a reading grand totalizer 100 (Figs. 2A, 3 and 4) and also into a printing sub-totalizer, which will hereinafter be described. The grand totalizer 100 is pivotally mounted at 99 (Fig. 3) near the left hand side of the machine (Fig. 1), and may be read through an opening 102 in the casing 103 of the machine. This totalizer is normally obstructed from view by a shield 104 (Figs. 2A and 6), the operation of which will hereinafter be described.

The totalizer elements include pinions 105 (Fig. 3), freely mounted upon a shaft 106 and normally disengaged from the actuators 68. A cam 107 secured to the rotating shaft 80 rocks the totalizer 100 to engage the pinions 105 with the actuators 68 at the proper time to enable the actuators to operate the totalizer wheels. Attached to the totalizer frame is an arm 108 which carries rollers 109 engaging the cam 107. Fastened to the pinion 105 is a gear 110 which meshes with a gear 111 freely mounted on a rod 112 supported near its ends in the totalizer frame. Fastened to and rotating with the gear 111 is a digit wheel 113 (Figs. 2A and 3). The digit wheels are seen through openings in a reading plate 114 attached to the totalizer frame.

The transfer mechanism is well known in this type of machine and will be but briefly described. The transferring mechanism between two elements only, will be described, it being understood that the transferring mechanism between the other elements is the same. It includes a lever 115 (Fig. 4) pivotally mounted upon the totalizer frame. This lever 115 carries a spring-actuated pawl 116 which engages a ratchet wheel 117 to move the digit wheel one division of movement when a transfer takes place. The pawl 116 normally rests upon a trip pawl 118, which is disengaged from the pawl 116 at each rotation of the trip cam 119. The rotating elements of the totalizer are retained against a retrograde movement by spring-actuated pawls 120.

This totalizer is reset to zero by an insertable key (not shown) which is guided through a sleeve 121 (Fig. 2A) fastened to the left hand side frame 49, and adapted to engage and turn a notched hub 122 of a gear 123 fast to the rod 112. The gear 123 being in mesh with a companion gear (not shown), fast on the shaft 106, will cause this shaft to rotate in unison with the rod 112. The usual spring-actuated resetting pawl 124 (Fig. 4), engaging a groove in the shaft 106, will cause the totalizer rotating elements to return to their zero positions when the rod 112 is turned by said insertable key.

Sub-totalizer

Figure 12:
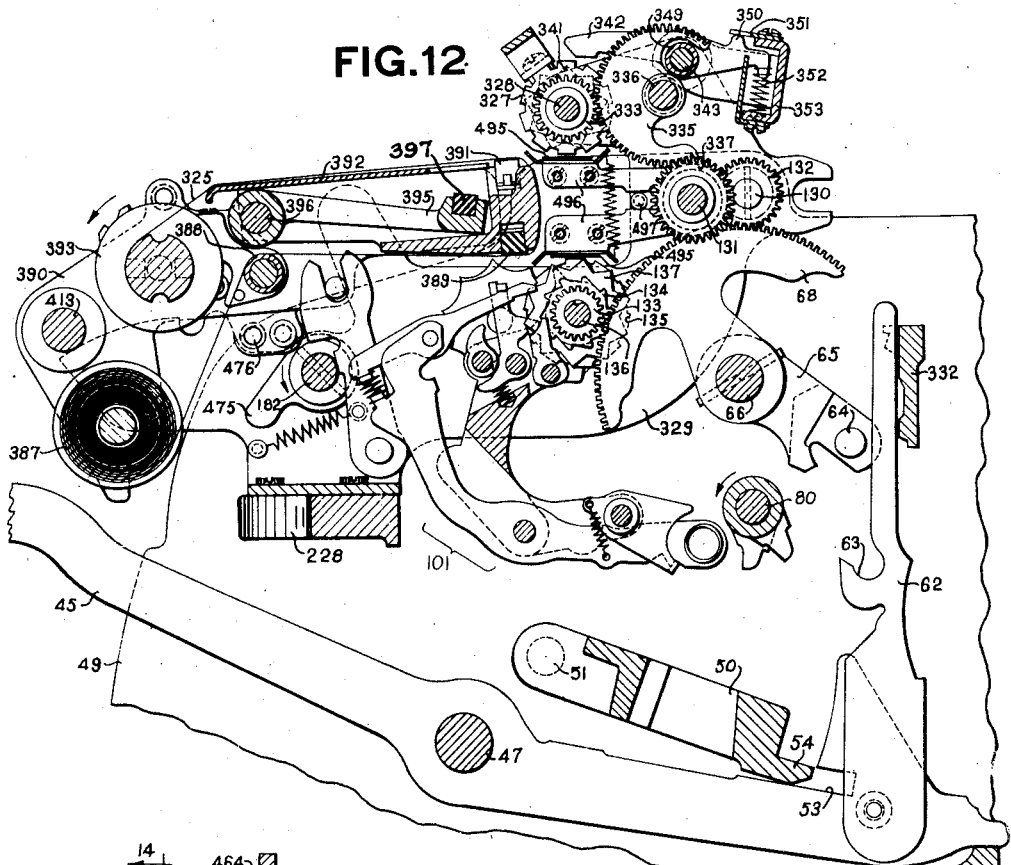
Fig. 12 is a transverse sectional view taken substantially on the line 12—12 of Fig. 2B, looking in the direction of the arrows.

The sub-totalizer 101 (Fig. 12) is a printing totalizer and the amounts are entered in this totalizer by a group of actuators 68 (Fig. 2B) which operate in unison with the actuators 68 (Fig. 2A) by the usual connecting shafts 130 and 131 and pinions 132 (Figs. 3 and 12). This totalizer, pivotally mounted at 129 (Fig. 5), is engaged with, and disengaged from the actuators by means similar to that of the grand totalizer previously described.

Each rotating element of this totalizer consists of a pinion 133 (Fig. 12), which is adapted to engage the actuator 68, a ratchet wheel 134, and a type wheel 135 fastened together and freely mounted upon a shaft 136. The dollar unit has, in addition to the parts mentioned above, a notched disk 137, the points of which furnish means for printing a period on the record strip between the tens and hundreds digits. The transfer mechanism is similar to that of the grand totalizer previously described.

When amount keys are depressed, the amounts represented by these keys are entered into the sub-totalizer as well as into the grand totalizer. The amount accumulated in the sub-totalizer may be printed upon a record strip when desired, without disturbing the totalizer elements, or the amount may be printed and the totalizer elements automatically restored to zero positions without disturbing the grand totalizer. The printing and resetting of the sub-totalizer is accomplished by operating mechanism independent of the lever keys, and will be hereinafter described.

When amount keys are depressed, in connection with the "Charge" and "Paid out" keys, both totalizers are disabled in the usual manner, which is not shown herein, but is illustrated and described in the Carney patents previously referred to.

Figure 30:
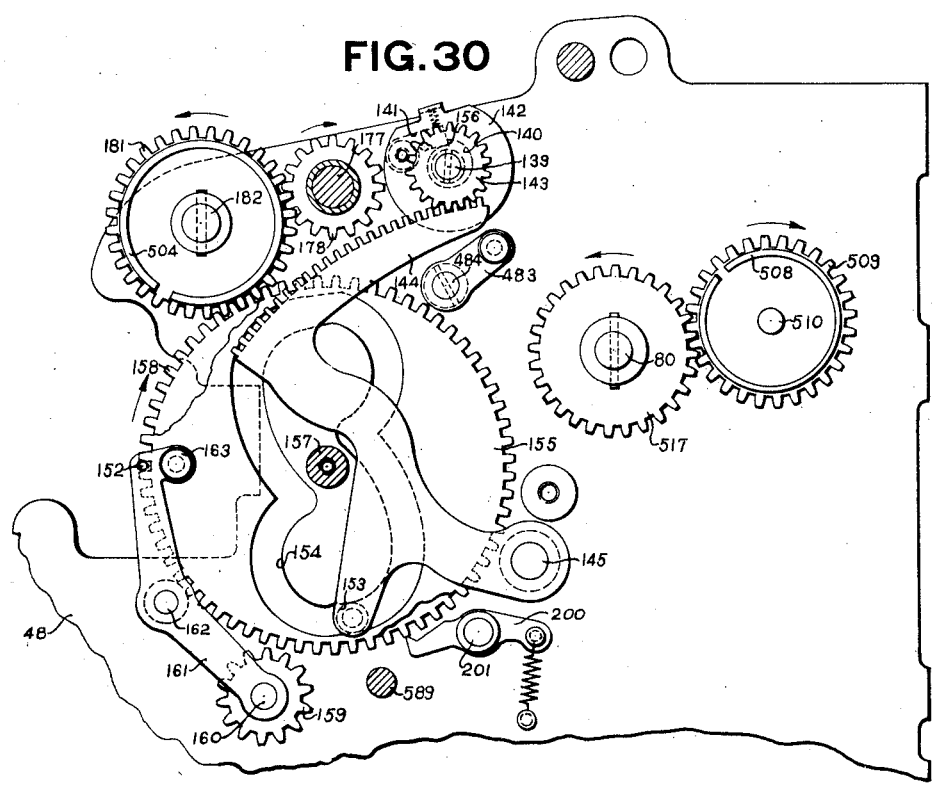
Fig. 30 is a transverse sectional view taken to the left of the control plate shown in Fig. 26, and shows the totalizer resetting mechanism.
Figure 31:
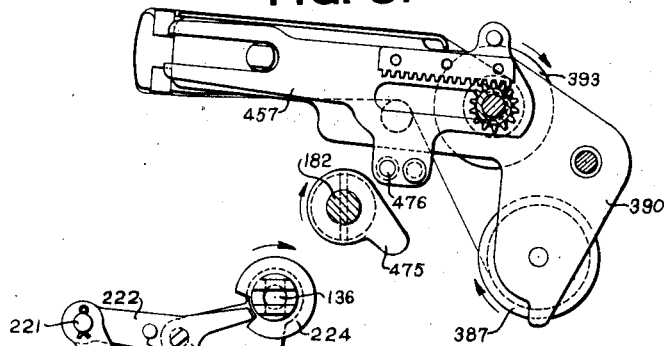
Fig. 31 is a detail left hand elevation of the paper feeding mechanism for a total printing operation.

The rotating elements of the sub-totalizer are reset to zero position during a reset operation by turning the totalizer shaft 136 clockwise (Fig. 12). The rotating elements have the usual spring-actuated reset pawls engaging a groove in the shaft, similar to the grand totalizer. The totalizer shaft 136 is connected by a flexible connection 138 (Fig. 2B) to a shaft 139 which is suported in the right side frame 48. Fast to the shaft 139, outside the side frame, is a notched collar 140 (Fig. 30) engaged by a spring-actuated pawl 141 pivotally mounted upon a disk 142 freely mounted upon the shaft 139. Secured to and rotating with the disk 142 is a gear 143 which meshes with a segment lever 144 freely mounted upon a stud 145 supported by the right hand side frame 48. The segment lever carries a roller 153 which enters a cam groove 154 formed in the side of a gear 155. This cam groove is formed so as to oscillate the segment lever 144 first clockwise and then counter-clockwise in a 180-degree movement of the gear 155, which is the travel of this gear during the reset operation. As the segment lever 144 moves clockwise, the gear 143 and disk 142 will move counter-clockwise more than one complete cycle to place the spring-actuated pawl 141 in a position to engage the shoulder 156 on the collar 140 as the segment lever 144 moves counter-clockwise in returning to its normal position, which will cause a complete rotation of the shaft 139 and the totalizer shaft 136 (Fig. 12).

The gear 155 (Fig. 30) is freely mounted upon a stud 157 projecting from the side frame 48, and is inactive except during a reset operation.

Prior to operating the machine for reset operations, the gear 155 is coupled by a broad pinion 159 with a driving gear 158, which is the same size as gear 155 and is freely mounted on the same stud. This broad pinion is freely mounted on a stud 160 carried in the lower end of a lever 161 pivoted at 162. The upper end of this lever carries a roller 163 which extends through a slot 164 (Fig. 26) formed in a control lever 165 pivotally mounted on a screw stud 166 in the side frame 48 (Fig. 26). When the pinion 159 is disengaged from the gears 155 and 158, a pin 152 mounted in the lever 161 engages the teeth of the gear 155 to prevent it from operating.

The control lever 165 (Fig. 26) is provided with three notches, 170, 171 and 172, which assists in aligning the lever 165 in its three controlling positions. The control lever is shown in the add position, or in the position which it occupies when amounts are entered in the totalizers, and in which position a spring-pulled aligning pawl 173, pivoted on a stud 174, is in engagement with the notch 170. To engage the pinion 159 (Fig. 30) with the gears 155 and 158, the control lever 165 (Fig. 26) is moved clockwise to engage the notch 172 with the pawl 173. As the notch 172 in the lever 165 is approaching engagement with the pawl 173, the roller 163 will travel from the upper part of the slot 164 to the lower part 175 of this slot, causing the lever 161 (Fig. 30) to rock counterclockwise, thereby engaging the pinion 159 with the gears 155 and 158. While these gears are coupled together, an operating crank 176 (Fig. 26) is given two cycles of operation in a clockwise direction, which causes the gears 155 and 158 to receive 180 degrees of movement in a clockwise direction. The operating crank 176 is secured to a rod 177 (Figs. 2B and 30) which extends through the hub of a pinion 178 and a support bearing 179 fastened to the side frame 48. The left hand end of the rod 177 is slotted to engage a pin 180 extending through the hub of the pinion 178. This construction furnishes a long bearing for rod 177. This pinion meshes with a gear 181 pinned to shaft 182. The gear 181 meshes with the gear 158. The gear 181 being twice the size of the pinion 178 and half the size of the gear 158 will make one complete cycle while the pinion 178 is making two cycles and the gear 158 a half cycle.

The operating crank 176 (Fig. 26) can not be moved clockwise until after it is given a slight movement in a counter-clockwise direction, which removes a spring-pulled stop pawl 183 (Fig. 28) from the path of a stopping block 184 secured to a disk 185 fastened on the shaft 182. As the shaft 182 approaches the completion of its cycle, a cam 186 fastened to the disk 185 engages an arm 187 freely mounted upon a stud 188 and moves this arm in a clockwise direction, and in so doing will move the arm 183 likewise to a position where the shoulder 189 formed in the end of the arm will engage the block 184 and stop the rotation of the shaft 182, as shown in Fig. 28. The arm 187 is operatively connected to the arm 183 by a pin 190 engaging an opening 191 in the arm 183. The opening 191 is slightly larger than the diameter of the pin 190 to enable a slight movement of the arm 187 before moving the arm 183.

A spring tensioned arm 192 (Figs. 2B and 28), freely mounted upon the stud 188, carries a roller 193 engaging a notch 194 in the disk 185 which forms means for assisting the shaft 182 and its cooperating rotating members to make a complete cycle of operation.

A spring tensioned pawl 200 (Fig. 30), mounted on a stud 201 and engaging the teeth of the gear 158, prevents a retrograde movement of the operating crank 176 (Fig. 26) and the other rotating elements operated by this crank, farther than is necessary to permit release of the pawl 183. The pawl 200 normally rests on top of one of the teeth of the gear 158, and when the operating crank 176 is moved backwardly far enough to release the pawl 183, the nose of the pawl drops between the teeth, and stops the gear 158 and the crank 176.

The sub-totalizer 101 (Figs. 12 and 29) is held rigid in its normal or printing position during the operation of the operating crank 176 (Fig. 26) by a bell crank lever 202 (Fig. 29) freely mounted on a stud 203. The bell crank lever 202 has a notch 204 adapted to engage the totalizer shaft 136. The lower end of the bell crank lever 202 carries a roller 205 cooperating with a disk 206 secured to the shaft 182. The roller 205 is maintained in engagement with the disk by a spring 207 and normally engages a notch 208 formed in the disk 206, and as the shaft 182 rotates the roller will ride on the periphery of the disk, during which time the notch 204 in the bell crank lever will embrace the totalizer shaft 136.

Special counters

Figure 32:
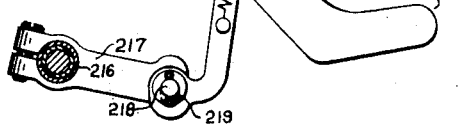
Fig. 32 is a detail right hand elevation of the recording totalizer resetting control, and reset counter operating mechanism.

A counting device 215 (Fig. 2A) is provided to count the number of times the sub-totalizer 101 (Fig. 12) is reset to zero. This counting device is operated by the usual tined pawl, carried by an arm (not shown), which is mounted on the left hand end of a telescopic sleeve 216 (Figs. 2A and 32). Secured to this sleeve, near the right hand end, is an arm 217 which has a pin 218 engaging an elongated opening 219 in the lower end of a link 220 pivoted at its upper end to a pin 221 mounted in a lever 222, which is pivoted at 223 to the frame of the totalizer 101. The right hand end of the lever 222 engages a notched disk 224 which is secured to and rotates with the totalizer shaft 136. A spring 225 attached to the link 220 and lever 222 is the means for maintaining the lever in engagement with the disk 224. The elongated opening 219 in the bottom of the link 220 permits an oscillation of the frame of the totalizer 101 without affecting the arm 217.

In addition to the reset counter, the machine is equipped with the usual special transaction counters and a customer counter, all of which are grouped together in a frame 227 (Figs. 2A and 3), fastened to a transverse bar 228 of the frame of the machine. The "Charge" counter 229 is operated directly from the "Charge" key 46 (Fig. 3). Secured to this key 46 is a forked arm 230 embracing a pin 231 carried by a lever 232 pivoted at 233 to operate the usual tined pawl.

The "Received on account" counter 237 is operated by a tined pawl 238 (Fig. 3), mounted on a lever 239 and operatively connected to the "Received on account" key in the same manner as the "Charge" counter mechanism previously described.

The "Paid out" counter 240 (Figs. 2A, 16 and 17) is operated by the "Paid out" key 46 (Figs. 2B and 18). Fastened to the key is a forked arm 241 embracing a pin 242 mounted in an arm 243 which is clamped to the right hand end of a sleeve 244 surrounding a rod 245 supported on the right hand end by a bracket 246 and on the left by the frame 227. Also clamped to the sleeve 244, near the left hand end, is an arm 247 (Fig. 17) which is bifurcated at its right hand end to engage a pin 248 mounted in a lever 249 which is freely mounted on the rod 233. This lever carries a tined pawl 250 which cooperates with ratchet wheels 251 secured to digit wheels 252 freely mounted on a shaft 253, which is the reset shaft for all of the special counters. The usual spring-actuated retaining pawls 254 prevent a retrograde motion of the counter wheels.

A "No sale" counter 260 (Fig. 2A) is operated by the "No sale" key 52 (Fig. 2B). The mechanism intermediate this counter and the "No sale" key is not shown in the drawings, as it is similar to the mechanism illustrated and described in connection with the "Paid out" key and counter, with the exception that the oscillating arms, similar to arms 243 and 244 (Figs. 16 and 18) are secured to the rod 245 instead of the sleeve 244.

A "Customer" counter 216 (Fig. 2A) is operated during each operation of the machine by a lever 262 (Fig. 3) pivoted on the key shaft 47 and extending toward the rear of the machine, and having a notch in engagement with the lip 54 on the key coupler. The forward and upward end of this lever is bifurcated to engage a pin (not shown) similar to pin 231, and in axial alinement with the same, which is mounted in a lever operating a tined pawl similar to the other special counters previously described.

All of the special counters are read through openings in a plate 263 supported by a pair of arms 264 fastened to the special counter frame 227. All of the special counters, being mounted on a common shaft 263, (Fig. 3) are reset to zero simultaneously by an inserted key (not shown) which engages a flat-sided hub 265 of a disk 266 pinned to the shaft 253. The shaft 253 is stopped after making one cycle in the resetting operation by the usual spring-tensioned pawls 267 and 268 cooperating with a notch 269 and a pin 270 in the disk 266.

Cash drawer

Figure 22:
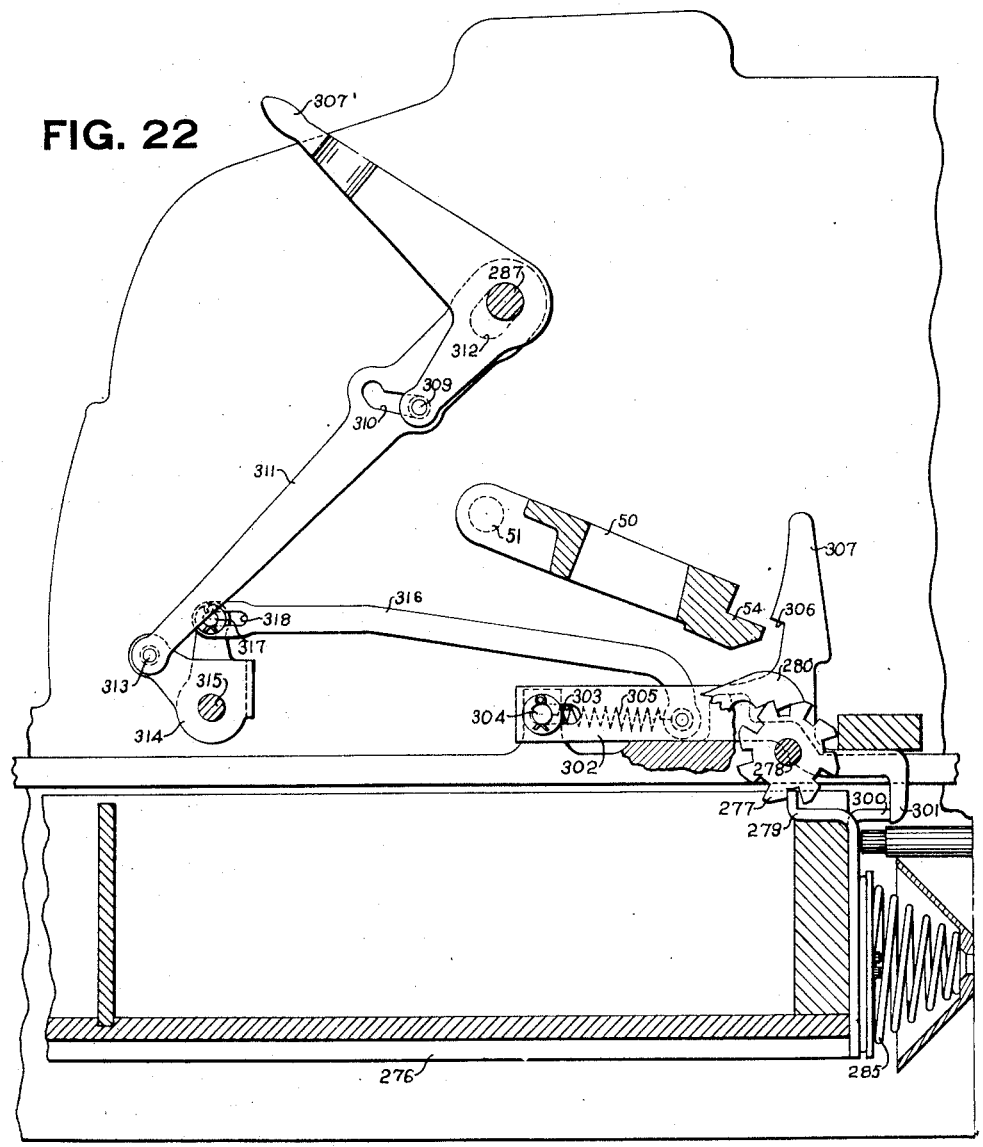
Fig. 22 is a detail view of the interlocking mechanism between the cash drawer and the key coupler.

The cash drawer 276 (Fig. 22) is the usual spring-actuated drawer, retained in closed position by a notched disk 277 freely mounted on a stud 278 supported by the frame of the machine. A latch plate 279, secured to the rear end of the cash drawer, is adapted to engage a notch in the disk 277 to retain the drawer in its closed position. The disk 277 (Figs. 22 and 25) is normally retained against rotation by a latch 280, which is pivoted at 281 and has pivotally mounted on its left hand end a spring-tensioned pawl 282, which has an upwardly extending arm 283 cooperating with a pin 284 mounted in the key coupler 50 to cause the latch 280 to move counter-clockwise. When the key coupler returns to its normal position during an operation of the machine, the pin 284 strikes the pawl 282 and withdraws the latch 280 from contact with the disk 277, allowing the cash drawer to be opened by the expansion of a spring 285.

The cash drawer may also be opened independently of the operation of the machine by a lever 286 (Fig. 23) freely mounted on a stud 287 and connected by a link 288 to a yoked lever 289 (Figs. 23 and 25), which is freely mounted upon a stud 290. A rearwardly extending arm 291 of the yoked lever 289 engages a pin 292 mounted in the latch 280 to release the cash drawer by the lever 286. This lever is moved counter-clockwise its greatest distance in a slot 293 (Fig. 24). A spring-actuated detent 294 (Fig. 23), pivoted at 295, is adapted to retain the lever 286 in either the locked position in which position the lever locks the machine against operation, or in the unlocked position, in which the machine may be operated. These two positions of the lever 296 are indicated by the index plate in Fig. 24. Notches 297 and 298 in the detent 294 cooperate with a pin 296 (Fig. 23) projecting laterally from the lever 286 to maintain the lever 286 in either its locked or unlocked position. Upon release of the lever after it has been moved to its lowest position, or the position to open the drawer, indicated on the index in Fig. 24, the lever will return to the unlocked position, whereupon the notch 298 embracing the pin 296 (Fig. 23).

To normally prevent operation of the machine with the cash drawer open, an interlocking mechanism is provided between the cash drawer and the depressible keys. This mechanism can be adjusted to permit the operation of the machine with the cash drawer both closed and open, or only when the cash drawer is closed. Mounted on the rear end of the cash drawer 276 (Fig. 22) is a plate having a lip 300 engaging a downwardly extending projection 301 on a locking slide 302 having an elongated opening 303 in its left hand end engaging a pin 304 supported in the frame of the machine. As the cash drawer moves forwardly, when released by the lever 286 (Fig. 23), a spring 305 (Fig. 22) will cause the slide 302 to move toward the left in unison with the cash drawer until the right hand end of the slot 303 engages the pin 304, in which position a shoulder 306, formed on an upwardly extending projection 307 of the slide 302, will engage the lip 54 of the key coupler 50, in which position the machine is locked against operation. In closing the cash drawer the lip 300 engages the projection 301 and returns the slide 302 to its normal position.

If the cash drawer is released by the regular operation of the machine, the key coupler 50 will be in a position intermediate the home position and the operated position when the cash drawer is released, so that the slide 302 will not move forwardly by the action of the spring 305 until the lip 54 of the key coupler has reached the position below the shoulder 306 on the slide 302, at which time the spring 305 will move the slide to its forward position with the shoulder 306 engaging the lip of the key coupler, and the machine will be locked against further operation until the cash drawer is returned to its closed or normal position.

When it is desired to operate the register with the cash drawer either closed or open, a lever 307' (Figs. 22, 23 and 24) is moved clockwise to the upper position in a slot 308 (Fig. 24). This lever is freely mounted on the stud 287 and carries a pin 309 in its lower end which engages a cam slot 310 formed in a link 311. The link has an elongated opening 312 in its upper end engaging the stud 287, and its lower end is pivoted at 313 to a yoked lever 314 freely mounted on a rod 315. The yoked lever 314 is connected by a link 316 to the slide 302. As the lever 307' is moved clockwise from the position shown in Fig. 22 to its second position, the pin 309 in moving through the slot 310 will cause the link 311 to move upwardly, thus rocking the yoked lever 314 clockwise, and placing a pin 317 carried by the yoke in the right hand end of an elongated slot 318 in the link 316. With the pin 317 in this position in the slot 318 the slide 302 can not move forwardly when the cash drawer is open, thereby permitting the operator to make subsequent successive operations of the machine with the cash drawer open.

Printing mechanism

The printing mechanism is located near the center of the machine and is adapted to print on a record strip of sufficient width to permit writing memoranda in connection with the printing.

Each item registered by the depressible keys is printed on a record strip 325 (Figs. 2B and 12), and if the item is a special transaction, the special transaction character is printed in connection with the amount, as shown in Fig. 2B.

The items 326 (Fig. 2B) are printed by type wheels 327 (Figs. 2B and 12) which are freely mounted upon a shaft 328 supported by the printer frame 329, which is fastened to a transverse bar 228 and to arms 330 and 331 secured to the back frame 332 (Figs. 2A, 2B and 5). Secured to the first, second and third amount type wheels 327 (Figs. 2B and 12) are pinions 333. The fourth printer wheel is pinned to the shaft 328, which has pinned to its left hand end a pinion 334 (Figs. 2A and 5). The pinions 333 (Figs. 2B and 12) are in mesh with segments 335 freely mounted on a rod 336 supported in the printer frame. These segments are also in mesh with intermediate gears 337 which are fastened to pinions 338 (Fig. 5) in mesh with the actuators 68. The pinion 334 (Figs. 2A and 5), which operates the fourth amount printer wheel, is in mesh with a segment 339, which is pivoted at 340 and is in mesh with an intermediate gear 341 pinned to the rod 130. This rod, as hereinbefore described, is oscillated by the actuator 68.

At the time an impression is taken from the type wheels they are held in alinement by notched disks 344 (Fig. 20) secured to the type wheels and engaged by spring tensioned pawls 342 freely mounted upon a rod 343 supported in the printer frames 329. The pawls are spaced laterally on the rod 343 by collars 349 (Figs. 2B and 12). The right hand ends 350 of the alining pawls 342 are normally held in engagement with a restraining bar 351 by springs 352. The restraining bar 351 and springs 352 are mounted on a yoke 353 freely mounted on the rod 343. The right hand side of the yoke 353 (Figs. 2B and 20) has a forwardly projecting arm 354 carrying a pin 355 which is connected by a link 356 to a pin 357 mounted in a three-armed lever 358 freely mounted on a stud 359 supported in the frame of the machine. The two downwardly projecting arms 360 of the lever 358 engage a cam 361 secured to the shaft 80. At the time the impression is being made from the type wheels, the cam 361 will cause the lever 358 to oscillate and engage the alining arms 342 with the notched disk 344.

The special transaction characters 365 (Fig. 2B) are printed on the record strip by a type wheel 366, which is freely mounted upon the shaft 328 and is connected by a sleeve 366′ (Fig. 18) to an arm 367, which is connected by a link 368 fastened to an arm 369 secured to a sleeve 370 freely mounted on a stud 371 supported in the frame of the machine. Also secured to the sleeve 370 is a partial gear 372 which is in mesh with a segment 373 pinned to a rod 374 supported at each end in the side frames of the machine.

The rod 374 is oscillated to different extents by cam arms 375 (Figs. 3, 18, 19 and 27). Two of the cam arms 375 are fastened to a sleeve 376 freely mounted on the rod 374, and the third cam arm is pinned to the rod 374. A clutch 377 (Fig. 27), pinned to the rod 374, cooperates with a slot in the left hand end of the sleeve 376 to permit oscillation of the rod by the "Received on account" key, to position the type wheel without oscillating the sleeve 376, which when it oscillates disables the grand totalizer by an arm 378, which is but partially shown as it is old structure and fully described in the patent to Cleal, No. 773,060, dated October 25, 1904. Referring to Fig. 19, the slots 379 in the cam arms 375 are of different form so as to give a differential movement to the type wheel actuating segment 373. The cam slots 379 are engaged by pins 380 (Fig. 18) in the special transaction keys. The cam arms 375 are retained in their normal positions by a spring 381 entwined about the rod 47.

Figure 13:
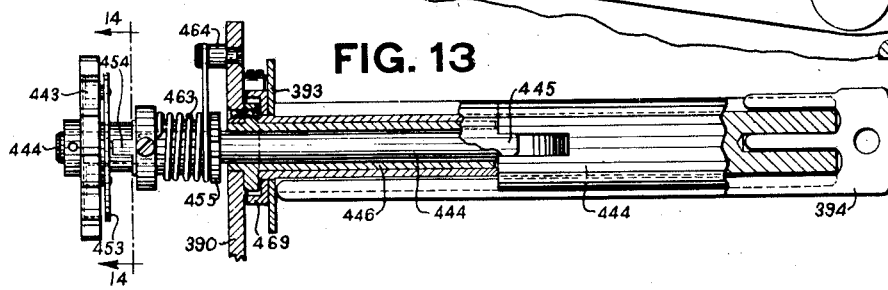
Fig. 13 is a detail view of the receiving roll, shown partly in section.

The record strip 325, on which the transactions are printed, is fed from a supply roll 387 (Figs. 9, 10 and 12) around a guide roller 388, under an impression platen 389, around the end of a paper carriage 390 and over an impression platen 391 and a writing table 392 onto a receiving roll 393. The record strip is attached to the receiving roll 393 by a key 394 (Fig. 13). The impression of the amount of each transaction as such amount is entered into the totalizer, is made from the type wheels 327 and 366 on the record strip by a swinging platen-bearing arm 395 (Figs. 9, 10, 12 and 20), is freely mounted upon a rod 396 supported in the paper carriage 390. After the paper carriage is moved into printing position during the operation of the machine, by mechanism which will hereinafter be described, the platen bearing arm 395 is caused to move counter-clockwise, bringing a platen 397 into engagement with the type wheels, as shown in Fig. 10. A rearwardly extending projection on the platen arm 395 (Fig. 20) carries a roller 398 which engages an oscillating arm 399 freely mounted on the shaft 131, and connected by a link 401 to a horizontal arm 402 pivoted at 403. The right hand end 404 of the arm 402 engages a cam 405 pinned to the shaft 80. The arm 402 is held in engagement with the cam 405 by a spring 406, one end of which is attached to the link 401 and the other end to a pin supported in the frame of the machine. The cam 405 is timed to move the oscillating arm 399 to a position where it will be below the roller 398 before the paper carriage is moved to the printing position so that as the end of the arm 402 drops off the high part of the cam 405 the oscillating arm 399 will engage the roller 398 and cause the platen arm 395 to swing counter-clockwise, bringing the platen 397 into engagement with the type wheels. An adjustable device 407 controls the home position of the oscillating arm 399.

Figure 33:
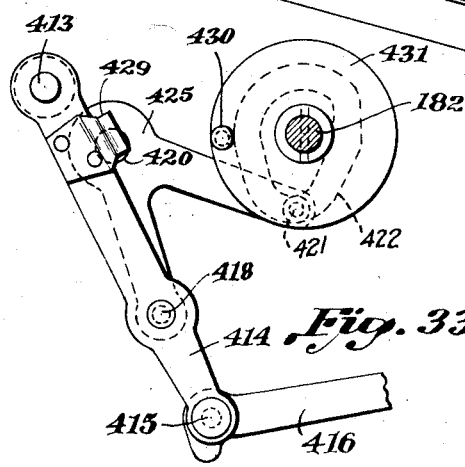
Fig. 33 is a detail right-hand elevation of a part of the carriage shifting mechanism, and shows the device for preventing overthrow of the carriage when it is being shifted to the printing position.

The paper carriage 390 (Fig. 5), is supported at its forward end upon a rod 413, which is carried by two swinging arms 414 located near each end of the rod 413. Each arm 414, one of which is shown in Fig. 5, is pivoted at 415 to a link 416, which connects the arm 414 with a bracket 417 secured to the key coupler 50. Each arm 414 is fulcrumed at 418 on a stud carried by a bell crank arm 419 pivoted at 420. A roller 421 carried by the bell crank arm 419 (Fig. 5) engages a cam groove 422 in a disk 447 secured to the rotating shaft 182. The other arm 419 carries a roller engaging a cam groove similar to the cam groove 422, in the disk 431 (Fig. 33). The disks 447 and 431 are shown in the top plan views in Fig. 2A and Fig. 2B. During the registering of items by the lever keys, the shaft 182 is stationary, thereby maintaining each bell crank arm 419 in a rigid position, enabling the arm 414 to fulcrum at the point 418, when the key coupler is oscillated, and giving a reciprocating movement to the paper carriage 390, which places the printing mechanism in the positions shown in Figs. 9 and 10, the former figure showing the normal, or home, position, and the latter figure the operated, or printing, position.

Figure 9:
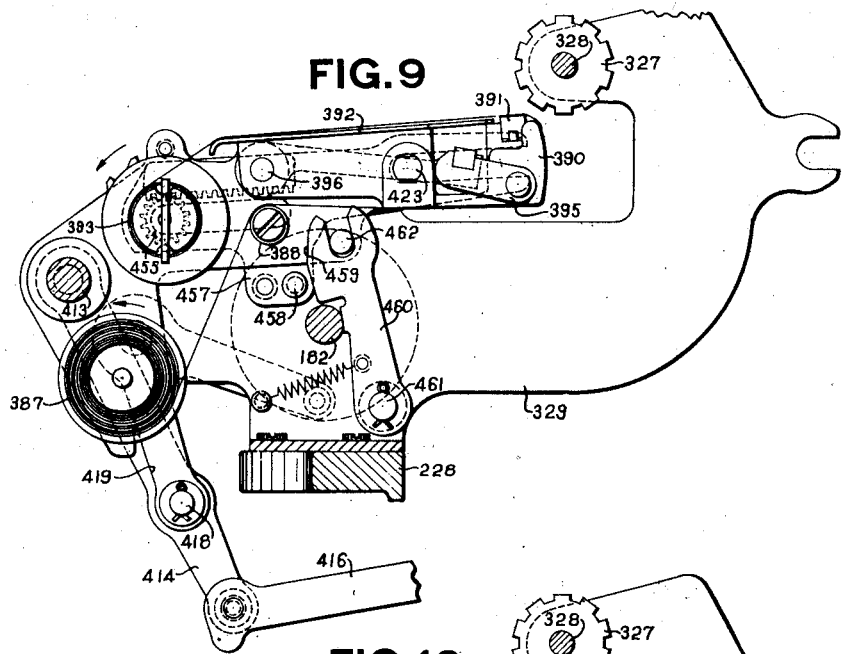
Fig. 9 is a transverse sectional view of the printing mechanism, shown in home position.
Figure 10:
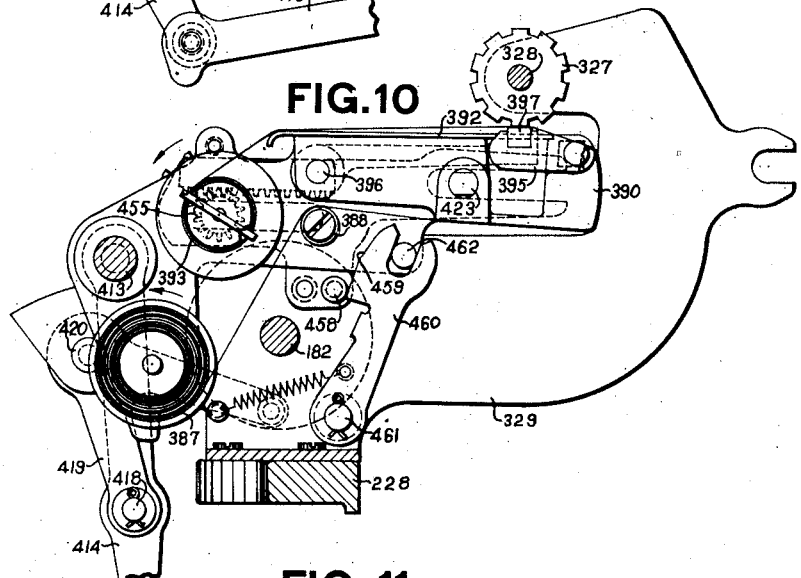
Fig. 10 is a transverse sectional view of the printing mechanism shown in printing position.
Figure 11:
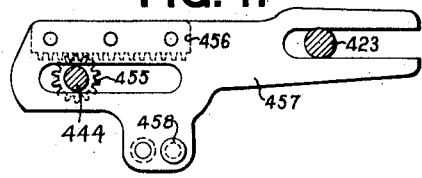
Fig. 11 is a detail left hand elevation of the paper feeding mechanism for item printing operations.

The paper carriage is normally maintained in a horizontal position by flat sided pins 423 projecting laterally from opposite sides of the carriage (Figs. 9, 10 and 20). These pins rest upon guides 424, riveted to bell crank arms 425 (Figs. 2A and 5) and under guides 427 and 428 (Fig. 2B). With the pins 423 between the guides described above, the paper carriage is maintained in a rigid horizontal position at the time of printing a transaction. A stop arm 429 (Figs. 2B and 33), secured to the right-hand arm 414, pin 430 projecting laterally from a cam disk 431 when the printing carriage is operated during item entering operations, to stop the carriage in its operated position. The cam disk 431 is at rest during item entering operations.

The record strip is fed from the supply roll to the receiving roll by three separate feeding devices. The first one is known as the manual feeding device and is operable independently of the operation of the machine. This device consists of a manually operable slide 437 (Figs. 1 and 5), which has a handle protruding through a slot in the casing of the machine. This slide is supported by studs 438 and 439 entering elongated openings 440 and 441. The forward opening 440 is placed on an angle with respect to the other opening 441 so as to give the slide a downward movement, as well as a forward movement, to engage a spring-actuated pawl 442, on the slide 437, with a ratchet wheel 443, pinned to the receiving roll driving shaft 444 (Figs. 5, 13 and 14) to rotate the receiving roll 393.

The receiving roll shaft 444 (Fig. 13) is clutched at 445 to the receiving roll 393. The shaft is reduced in diameter at the clutch point and extends through a sleeve 446 supported in the printer carriage 390.

Figure 14:
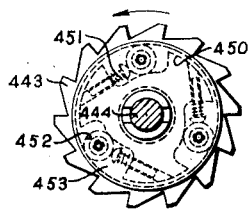
Fig. 14 is a detail sectional view of the receiving roll driving mechanism, taken on the line 14—14 of Fig. 13.

The mechanical operation of the record strip receiving roll is produced by a friction clutch, shown in Fig. 14. As this form of clutch is old in the art it will be but briefly described. A clutch disk 450 (Fig. 14), carrying spring-actuated plunger 451, is positioned within a recessed part of the ratchet wheel 443. Cooperating with the clutch disk 450 and the wall of the recessed part of the ratchet wheel are three rollers 452 freely mounted on pins supported in a disk 453, which is freely mounted on the hub of the clutch disk 450. The hub of the clutch disk 450 is mortised to embrace a tenon 454 (Fig. 13) on the hub of a pinion 455 which is freely mounted on the shaft 444.

Engaging the pinion 455 (Figs. 9, 10, 11 and 13) is a rack 456, riveted to a feed actuating slide 457, which is bifurcated at its right hand end to engage the pin 423 to support the right hand end of the slide in a horizontal position. A downwardly extending projection on the slide 457 carries a pin 458 which is adapted to engage a cam edge 459 formed on a spring-tensioned arm 460 pivoted at 461. The arm 460 (Figs. 9 and 10) is bifurcated at its upper end to engage a pin 462 mounted in the paper carriage 390. As the paper carriage moves into printing position, the arm 460 moves clockwise, and as it does so the slide 457, moving with the paper carriage, causes the pin 458 to engage the cam edge 459 of the arm 460, and owing to the angle of the edge 459, the slide 457 is moved in a direction opposite to the movement of the paper carriage, which movement causes a sufficient rotation in a counterclockwise direction of the receiving roll to move the paper and give the proper spacing to the printing of items, as shown in Fig. 2B.

Figure 15:
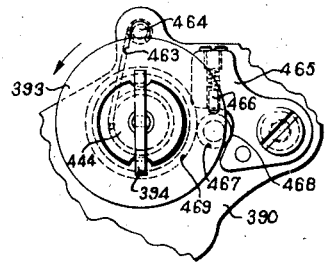
Fig. 15 is a detail right hand end view of the receiving roll.

Upon the return of the paper carriage to home position, the slide 457 is returned to its home position by a spring 463 (Figs. 13 and 15), one end of which is secured in a collar fastened on the hub of the pinion 455 and the other end attached to a pin 464 mounted in the paper carriage 390.

A friction retaining device prevents retrograde movement of the receiving roller 393. This device consists of an arm 465 fastened to the paper carriage 390 by a screw and rivet. This arm 465 supports a spring-pressed plunger 466 which maintains a roller 467 in engagement with an edge 468 of the arm 465 and the periphery of a flange 469 secured to the receiving roller 393.

The second mechanical feed for the receiving roll is provided to bring the printing, which occurs during a total printing operation, into a reading position. During total taking operations the cam groove 422 (Fig. 5) cooperates with the arm 419 to shift the printing carriage. The cam groove is shaped to move the carriage into printing position and then beyond the printing position. As it is moved beyond its printing position, a pin 476 (Fig. 12) on the rack plate 457 is engaged by a cam arm 475, thereby moving the rack plate to the left as the printing carriage is moved to the right. This results in a long feed being given to the detail strip, thereby bringing the imprint of the total amount to the top of the carriage as shown in Fig. 2B.

The total printing is made from the sub-totalizer printing wheels 135 (Fig. 12) by the impression platen 389 mounted in the lower side of the paper carriage, and from department number printing wheels 477 (Figs. 2A and 5) and special printing wheels 478 (Fig. 2A) and 479 (Fig. 2B) by the impression platen 391 mounted in the upper side of the paper carriage. The paper carriage is oscillated during a total printing operation by a cam 472 (Figs. 2A and 5) cooperating with a roller 473 carried by the bell crank lever 425 and by a companion cam 474 (Fig. 2B) cooperating with a roller carried by the bell crank lever 426. The contour of the cam is such that the paper carriage is operated first in a counter-clockwise direction, as shown in Fig. 5, to take an impression from the totalizer wheels, and then in a clockwise direction to take an impression from the upper group of wheels mounted on the rod 328. In a total printing operation the paper carriage is moved a shorter distance to bring it into impression taking position than in a transaction operation. The carriage is shifted a shorter distance during total taking operations than in transaction printing operations, because the total printing platens 389 and 391 are normally nearer the printing line than the transaction printing platen 395.

The short shifting of the carriage during total taking operations is accomplished by a pair of cam races 422 (Figs. 5 and 33) one on each side of the carriage, which oscillate the bell crank arms 419 pivoted on the studs 420. It will be remembered that the links 414 pivot on the studs 418 carried by the bell crank arms 419 during item entering operations. During total taking operations when the cam races 422 rock the bell crank arms 419 in a counter-clockwise direction (Fig. 5) the links 414 will be rocked with the studs 415 as their pivots. This movement of the links 414 causes the carriage to be shifted far enough to move the total printing platens 389 and 391 opposite the printing line for both the upper and lower type wheels.

The three department number printing wheels 477 (Figs. 2A and 5) are freely mounted upon the shaft 328 and are adapted to be positioned manually to print any desired number on the record strip during a totalizing operation. These wheels are retained in their selected positions by an alining arm 480 which is secured to a rod 343 by a set screw. This alining arm also retains the printing wheel 478 (Fig. 2A) in its selected position. This wheel may have various arrangements of printing type on the different divisions of the wheel.

The special type wheel 479 (Fig. 2B), freely mounted on the shaft 328, in this particular machine, contains the words "Read" and "Reset", which are printed in connection with the total. The word "Read" indicates that a total has been printed from the printing sub-totalizer without resetting to zero, while the word "Reset" printed on the record strip indicates that in addition to printing the total from the sub-totalizer it has been reset to zero. This printing wheel is differentially positioned by the control lever 165 (Fig. 26). Engaging a cam slot 481 formed in the control lever is a roller 482, mounted on an arm 483 (Fig. 21), which is pinned to a rod 484 supported in the frame of the machine. Also fastened to the rod 484 is an arm 485 connected by a link 486 to an arm 487 secured to a sleeve 488 telescoped on the sleeve 366. Referring to Fig. 2B, the sleeve 488 extends toward the left and has secured to its left hand end a yoke 489 which is fastened by a screw to the type wheel 479.

For the convenience of placing a new roll of record paper on the paper carriage, this carriage is adapted to be swung upwardly and forwardly at its pivot point 413, the pins 423 (Fig. 5) being normally out of the plane of the guides 427.

The printing mechanism is provided with an endless belt inking ribbon 495 (Figs. 2A, 5 and 12) which provides means for making legible impressions from both groups of type wheels. This ribbon is guided across the face of the type wheels by plates supported on spring-tensioned arms 496 (Fig. 12) normally held in engagement with a pin 497 supported in the printer frame. These flexible arms 496 permit the ribbon and guides to swing with the impression platens when making the impression. The ribbon also passes over a pair of rollers 498 (Fig. 5) placed at each end of the printer frame. The ribbon is given a slight feeding movement at each operation of the machine by a pawl and ratchet feeding device (not shown), which is operated by an oscillating lever connected to a pin 499 mounted in the link 401 (Fig. 20).

The operation of the machine is under the control of a plurality of locks on the left hand side of the machine, which are shown in Fig. 6, and the control lever 165 (Fig. 26). The control lever is shown in normal, or add, position, which permits the operation of the machine by the lever keys. This lever is pivoted at 166 and is guided in its operation by a screw 500 engaging a slot 501 in the control lever and a bracket 502 fastened to the side frame of the machine. With the control lever in the add position, a flange 503 thereon engages a notch in a circular flange 504 formed on the gear 181 and prevents operating the crank 176. When the control lever is moved to the "read" position, in which position the pawl 173 engages the notch 171, the flange 503 is moved out of engagement from the circular flange 504 on the gear 181, which permits rotation of the gear 181, the circular flange moving in the space 505 provided between flange 503 and a flange 506. As the gear 180 is rotating with its flange between flanges 503 and 506, the control lever 165 can not be moved either clockwise or counter-clockwise. With the control lever in the "read" position, the rotating shaft 80, which is operated by the lever keys, is locked against operation by a flange 507 formed on the control lever and engaging a circular flange 508 formed on a gear 509, which is freely mounted on a stud 510 and in mesh with a gear 517 fastened to the shaft 80. The flange 507 is also effective in preventing rotation of the shaft 80 when the control lever is moved to the reset position with the pawl 173 engaging the notch 172, in which position the operating crank 176 can be turned, as the flange 506 is inside of the circular flange 504. The control lever 165 is manipulated manually by a handle 511 protruding through a slot 512 (Fig. 24) in an index plate which is located under a cover 513 (Figs. 1 and 23) of the casing of the machine. The opening of the cover 513 is under the control of a lock on the left hand side of the machine, which will hereinafter be described.

In addition to the lever keys being disabled when the control lever is in either the "read" or "reset" position, the lever keys can be disabled with the control lever in the "add" position by the lever 286 (Figs. 23 and 24), which was previously described in connection with opening the cash drawer. With the lever 286 in the position shown in Fig. 23, a rearwardly extending projection 514 is in engagement with a shoulder 515 on a disk 516 secured to the rotating shaft 80, in which position the shaft can not rotate, and consequently the lever keys are disabled. In moving the lever 286 (Fig. 24) from the locked to the unlocked position on the index plate, the pin 296 (Fig. 23) passes out of the notch 297 and engages with the notch 298, where it is retained. In this position the projection 514 is disengaged from the shoulder 515, permitting rotation of the shaft 80.

Locks

Figure 8:
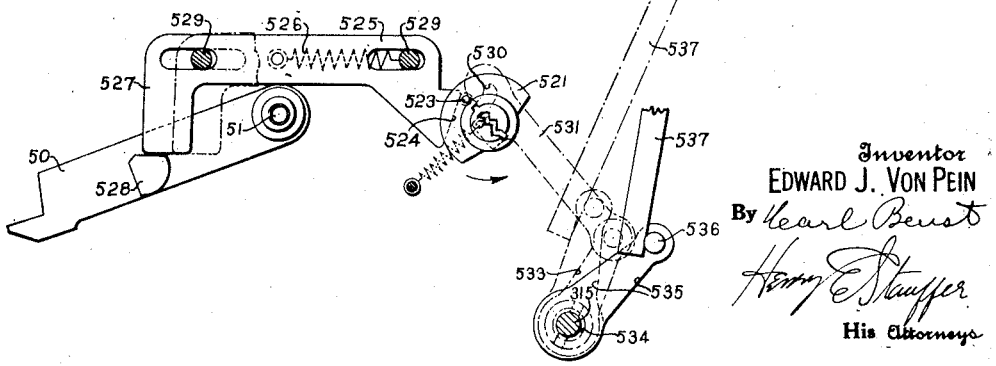
Fig. 8 is a detail view of part of the locking mechanism shown in Fig. 6.

Referring to Fig. 6, lock 521 will be known as the clerks' lock. This lock is adapted to lock the lever keys against operation and control the opening of a cover 522 (Figs. 2A and 23) over the paper carriage of the printer. The disabling of the lever keys by this lock is accomplished by inserting a key in the lock and turning it clockwise (Figs. 6 and 8), which will engage a pin 523, mounted in the revolving part of the lock, with an angular edge 524 of a horizontal sliding plate 525 and move this plate toward the left against the tension of a spring 526, placing a downwardly extending projection 527 over a lug 528 projecting from the key coupler 50. The plate is slidably mounted on pins 529 which engage elongated openings in the plate. Referring to Fig. 8, the plate 525 is shown in its operated position.

By turning the key in the lock 521 counter-clockwise past the home position, the sliding plate 525 assumes the position shown in Fig. 6 and the pin 523 in the lock engages a curved notch 530 in a link 531, which is pivoted at 532 to an arm 533 fast on a sleeve 534 surrounding the rod 315. As the pin in the lock continues its counter-clockwise movement, the link 531 moves upwardly, thus rocking the arm 533 and sleeve 534. Also secured to the sleeve 534 is a pair of arms 535, only one of which is shown, carrying a pin 536 which engages the lower end of a lever 537 pivoted on a stud 538 supported by the casing of the machine. The upper end of the lever 537 carries a pin 539 which normally engages the shoulder 540 on a downwardly extending arm 541 fastened to the casing cover 522 (Figs. 6 and 23). The lever 537 is guided in its movement by a pin 542 engaging a slot in the lever, and is held in engagement with the pin 536 by a spring 543. Referring to Fig. 8, the lever 537 and its cooperating parts are shown by broken lines in their operated positions. The link 531 (Fig. 6) is normally held in engagement with a pin 550 by a spring 551.

Figure 1:
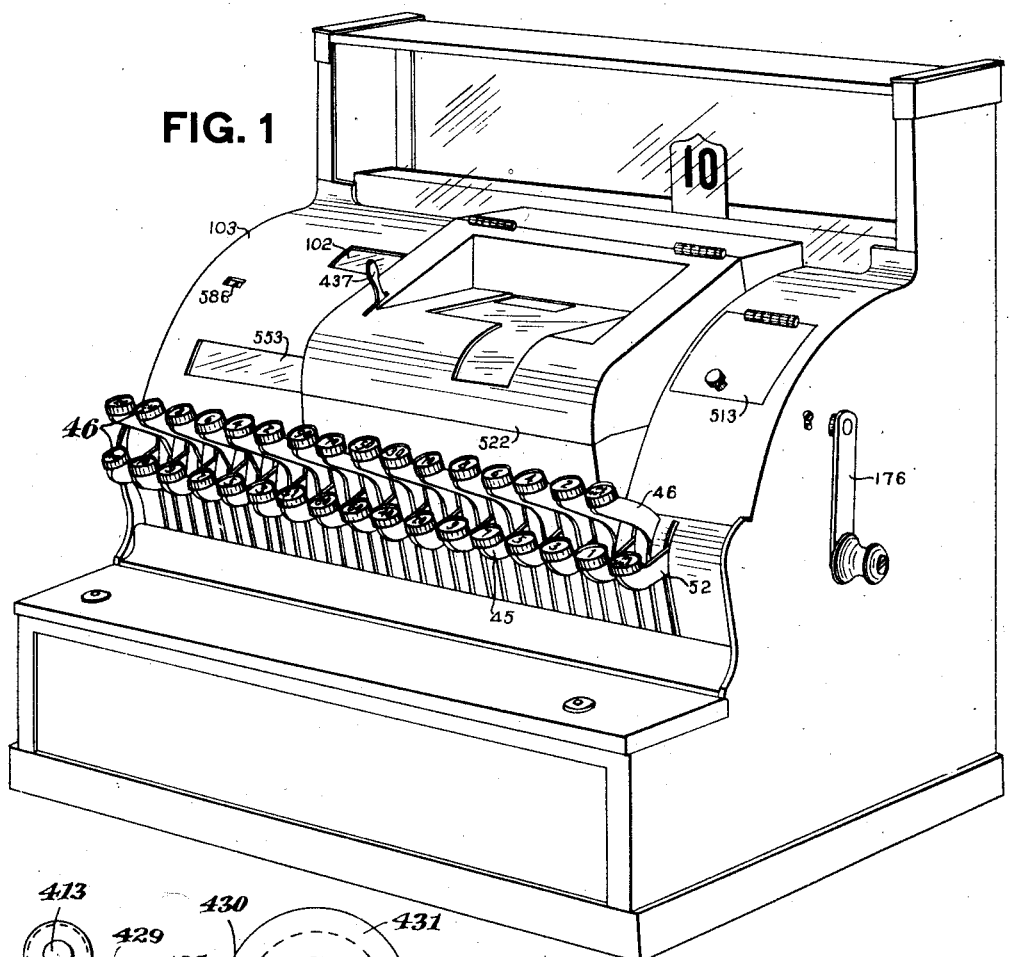

Lock 552 will be known herein as the "manager's" lock. It controls the reading of the special counters, which are read through an opening 553 in the casing 103 (Fig. 1), and controls access to the three control levers shown in Fig. 24. By inserting a key in lock 552 and turning the key clockwise, a pin 554, mounted in the rotating part of the lock and moving in an elongated opening 555 in the lower end of a bell crank lever 556, moves the bell crank lever counter-clockwise on its pivot 557 and raises a shield 558, secured to the bell crank lever, from in front of the special counters, making them visible through the opening 553 (Fig. 1). The bell crank lever 556 is guided in its movements by a screw projecting through an opening 559 therein.

The bell crank lever is connected by a link 560 (Fig. 6) to an arm 561 pinned to the rod 315. Also pinned to the rod 315, near its right hand end, is an arm 562 (Fig. 23) having a pin 563 engaging an elongated opening in the lower end of a link 564, which is pivoted at its upper end to a bell crank lever 565 freely mounted on the shaft 182. A spring 566, with one end attached to the bell crank lever 565 and the other end attached to the link 564, normally maintains a flange 567 on the bell crank lever 565 in engagement with an arm 568 secured to the hinged cover 513. As the key is turned in the lock 552 (Fig. 6), rocking the rod 315 (Fig. 23) counter-clockwise, the flange 567 disengages from the arm 568, permitting the hinged cover 513 to be raised, giving access to the various control levers shown in Fig. 24.

The manager's key, which operates lock 552, is also adapted to operate the clerks' lock 521, previously described. This gives the manager access to the parts of the machine which the clerk has access to, but does not permit the clerk to have access to the controls which the manager has access to.

Lock 574, which will be known herein as the "proprietor's" lock, controls access to the grand totalizer, which is read through the opening 102 in the casing (Fig. 1), and also permits moving the control lever 165 (Fig. 26) to the reset position, which permits the resetting of the sub-totalizer to zero. A pin 575 mounted in the rotatable part of the lock 574 engages an elongated opening 576 in a downwardly extending arm 577 of a lever 578 pivoted at 557, and as the rotating part of the lock is moved by an insertable key the lever 578 is moved counter-clockwise, guided by a slot 579 and a screw stud 580. Secured to the upper end of the lever 578 is the shield 104 which normally covers the opening 102 in the casing through which the grand totalizer is read.

A counting device 581 (Figs. 6 and 7) is operated each time the lever 578 is oscillated by an angle slot 582 formed in the upper part of the lever 578. Said slot 582 embraces a pin 583 carried by an arm 584 fastened to a shaft of the counting device. Movement of the arm 584, by the pin 583 and slot 582, causes "1" to be added to the counting device each time the proprietor's lock is operated. This counting device is mounted upon a bracket 585 secured to the side frame of the machine, and is read through an opening 586 in the casing 103 (Fig. 1).

The lower end of the lever 578 (Fig. 6) is connected by a link 587 to an arm 588 pinned to a rod 589. The rod 589 extends through the machine to the right hand side, (Fig. 26) where an arm 590, pinned to the rod 589, has a laterally extending pin 591 cooperating with a shoulder 592 formed on the control lever 165 to prevent the control lever from being moved into the reset position when the arm 590 is in normal position, as shown in Fig. 26. As the lever 578 (Fig. 6) moves counter-clockwise, the rod 589 is rocked clockwise (Fig. 6) and counter-clockwise (Fig. 26), moving the pin 591 out of the path of the shoulder 592, which permits the control lever 165 to be moved clockwise to its reset position. The link 587 (Fig. 6) is connected to the arm 588 through an elongated opening in the right hand end of the link and a stud 593 secured in the arm 588. A spring 594 maintains the stud 593 in the left end of the slot in the link except when the control lever 165 (Fig. 26) is in the reset position and the lock 574 is returned to home position, the rod 589 being unable to move in unison with the lever 578 on account of the pin 591 not being permitted to enter the space above the shoulder 592. The movement of the link 587 with the lever 578 increases the tension of the spring 594, as the pin 593 is prevented from moving in unison with the link. When the control lever 165 is moved from the reset position to either of the other two positions after the lock 574 is returned to its home position, the pin 591 (Fig. 26) will again be moved to the position shown in Fig. 26 by the spring 594 (Fig. 6), moving the arm 588 counter-clockwise until the pin 593 again engages the left hand end of the elongated opening in the link 587.

The proprietor's key, which operates lock 574, is adapted to also operate the manager's lock 592 and the clerks' lock 521, which gives the proprietor access to all of the controlling elements of the machine.

*Operation*

In operating the machine to register a cash transaction, the amount keys 45 (Fig. 1) are depressed, with the following results: The amount represented by the depressed keys will be entered in the sub-totalizer and also grand totalizer, printed on the record strip, indicated, the customer counter operated, and the cash drawer opened.

A "received on account" transaction is registered in a similar manner to a "cash" transaction, and the same results obtained, with this difference. The "Received on account" key is depressed in connection with the amount key and the "rec'd. on acc't." counter is operated, in addition to the "customer" counter.

"Charge" and "paid out" transactions are registered in a manner similar to "rec'd. on acc't." transactions, with this difference: The amount involved in the transaction is not recorded in either of the totalizers, and a "charge" or a "paid out" counter is operated, according to the special key depressed.

Should the operator desire to have a greater space between single items, or between groups of items, for some special reason, the record paper is spaced independently of the operation of the machine by manual operation of the slide 437.

If the supply of record paper in the printing mechanism becomes exhausted, the operator may install a new roll of paper by operating the clerks' lock on the left hand side of the machine, which permits the raising of the cover over the printing mechanism, when access may be had to install the new roll of paper.

Should the manager or proprietor desire to read the sub-totalizer, he may do so by inserting his key in the manager's lock and operating the same, which gives them access to the lever control compartment under the cover 513, when the control lever can be placed in the "read" position. The operating crank 176 on the right hand side of the register is then given two cycles of operation, causing the amount on the sub-totalizer to be printed on the record strip, in connection with a number representing the department and the words "Total read." Also, the special counters may be read through the opening 553. With access to the lever controls, the register may be controlled to be operated with the drawer closed, or the machine may be locked against operation, or the drawer opened without operating the machine.

If the proprietor of the store desires to read the grand totalizer, which is seen through the opening 102 (Fig. 1), or read and reset the sub-totalizer, he inserts his key in the proprietor's lock, which he operates, and then removes his key and inserts it in the manager's lock, which he also operates, which gives him access to the control lever compartment 513. He then places the control lever in the "reset" position and operates the crank 176, with the result that the amount on the sub-totalizer is printed on the record strip, in addition to the department number and the words "Total reset," and the totalizer is reset to zero.

The counting device shown through the opening 586 records the number of times the proprietor's lock has been operated. The "No sale" key provides a means for a clerk to open the cash drawer, but not without making a record of the same by printing ciphers on the record strip.

While the form of mechanism herein shown and described is admirably adapted to fulfill the objects primarily stated, it is to be understood that it is not intended to confine the invention to the one form or embodiment herein disclosed, for it is susceptible of embodiment in various forms, all coming within the scope of the claims which follow.

What is claimed is:

1. In a machine of the class described, the combination of a record strip, a record strip carriage having normal and moved positions, automatic means to move the carriage, type wheels, an impression platen arm mounted on said carriage to travel therewith, a driving shaft, a cam mounted on said driving shaft to operate the impression platen arm when the carriage is in the moved position, a spring tensioned arm engaging said cam, a movable member adapted to engage said impression platen arm and cause said platen to make an impression from said type wheels upon said record strip, and means intermediate of said movable member and said spring tensioned arm for operating said movable member.

2. In a machine of the class described, the combination of a record strip carriage having a home position and an operated position, of manipulative means for moving said carriage into its operated position, a plurality of impression platens carried by said carriage and positioned on opposite sides of the carriage, and means operated by said manipulative means for oscillating said carriage when in said operated position to make impressions with said plurality of impression platens.

3. In a machine of the class described, the combination of a plurality of lever keys, a device operated by said keys, a record strip carriage having a home position and a plurality of operated positions, a lever having a plurality of fulcrums, said lever being connected at one end to said carriage and adapted to move said carriage into one operated position, a link connecting the opposite end of said lever with said device to operate said lever on one of its fulcrums, and means adapted to operate said lever on another of its fulcrums to move said carriage into a second operated position.

4. In a machine of the class described, the combination of a plurality of lever keys, a key coupler operated by said keys, a record strip carriage having a home position and a plurality of operated positions, a lever having a plurality of fulcrums, said lever being connected at one end to said carriage and adapted to move said carriage into one operated position, means driven by said lever keys to operate said lever on one of its fulcrums, and operating means adapted to operate said lever on another of its fulcrums to move said carriage into a second operated position.

5. In a machine of the class described, the combination of a plurality of lever keys, a record strip carriage having a home position and a plurality of operated positions, a lever having a plurality of fulcrums, said lever being operated by said keys on one of its fulcrums and connected to said carriage to move said carriage into one operated position, and operating means adapted to operate said lever on another of its fulcrums to move said carriage into a second operated position.

6. In a machine of the class described, the combination of a lever key, a record strip carriage adapted to be moved different extents, means operated by said lever key, a connection between the carriage and said means to move said carriage one extent, driving means to operate the connection for moving said carriage another extent, a record strip receiving roll driving means, and means adapted to operate said receiving roll driving means one extent when said carriage is moved by said key and another extent when said carriage is moved by said driving means.

7. In a machine of the class described, the combination of a lever key, a record strip carriage adapted to be moved different extents, means operated by said lever key, a connection between the carriage and said means to move said carriage one extent, driving means to operate the connection for moving said carriage another extent, a record strip receiving roll adapted to receive a differential movement, a type printing wheel, a plurality of impression platens mounted on said carriage and adapted to engage said type printing wheel, and means for moving said receiving roll one extent when one impression platen engages said type printing wheel and another extent when a second impression platen engages said type printing wheel.

8. In a machine of the class described, the combination of a lever key, a movable record strip carriage, a plurality of impression platens mounted in said carriage, an impression platen mounted in a movable member supported by said carriage, groups of printing wheels arranged in vertical alinement, devices connected to the lever key means intermediate said devices and said carriage adapted to move said carriage to position the platen mounted in the movable member in cooperative relation with one group of said printing wheels, and means adapted to operate the intermediate means for moving said carriage to position the impression platens mounted in the carriage in cooperative relation with said groups of printing wheels.

9. In a machine of the class described, the combination of a lever key, a record strip carriage having a home position and a plurality of operated positions, a plurality of impression platens mounted in said carriage, two groups of printing wheels arranged in vertical alinement, devices connected to the lever key, means intermediate said devices and said carriage for moving said carriage to place one of said impression platens in cooperative relation with one group of said printing wheels, and manipulative means adapted to operate the intermediate means to move said carriage to place other impression platens into cooperative relation with said groups of printing wheels.

10. In a machine of the class described, the combination of a lever key, a movable record strip carriage, a plurality of impression platens mounted in said carriage, groups of printing wheels arranged in vertical alinement, manipulative means for moving said carriage to position the impression platens mounted in the carriage in cooperating position with said groups of printing wheels, and means operated by said manipulative means for operating said record strip carriage to bring said plurality of impression platens into engagement with said groups of printing wheels.

11. In a machine of the class described, the combination of item entering means, a movable record strip carriage, an impression platen member pivotally mounted in said carriage, a printing wheel, means intermediate the item entering means and said carriage for operating said carriage to position said impression platen member in vertical alinement with said printing wheel, and means operated by said item entering means for rocking said impression platen member into engagement with said printing wheel.

12. In a machine of the class described, the combination of, a movable record strip carriage, a plurality of impression platens mounted in said carriage in vertical alinement, two groups of printing wheels arranged in vertical alinement, an operating means for moving said carriage to position said impression platens in vertical alinement between said printing wheels, and means operated by said operating means for rocking said carriage to engage one impression platen with one group of printing wheels and then the other platen with the other group of printing wheels.

13. In a machine adapted to accumulate and print items and their total, an impression platen bearing carriage adapted to receive a reciprocating motion and an oscillating motion, printing wheels, an impression platen mounted in said carriage to engage said printing wheels during the oscillating motion of said carriage, and means for reciprocating and oscillating the carriage.

14. In a machine of the class described, the combination of two type lines, a slidably and pivotally mounted paper carriage, platens carried thereby, means for sliding said carriage to bring the platens into printing position, and means for moving said carriage about its pivot to swing said platens to take impressions from both lines during a single operation of the machine.

15. In a machine of the class described, the combination of type lines, a pivotally mounted paper carriage, pivoted means for slidably supporting said carriage, means for sliding the carriage into printing position, and means for moving said supporting means about its pivot to move said carriage to take impressions from said type lines.

16. In a machine of the class described, the combination of a type line, a paper carriage, means for slidably supporting said carriage, and means for moving said supporting means to move said carriage to take an impression from said type line.

17. In a machine of the class described, a movable paper supporting carriage, paper feeding means carried thereby, actuating means for said feeding means movable with said carriage, and means operated by said carriage for retarding the movement of said actuating means during a part of the movement of said carriage.

18. In a machine of the class described, the combination of a slidably mounted paper carriage, paper feeding means carried thereby, a rack for actuating said feeding means carried by said carriage, and rotatably mounted means for operating said rack during a part of the movement of said carriage.

19. In a machine of the class described, the combination of a slidably mounted paper supporting carriage, paper feeding means, means for moving said carriage into printing position, and means for moving said carriage beyond printing position to operate said feeding means.

20. In a machine of the class described, the combination of a slidably mounted paper supporting carriage, means for moving said carriage into printing position, a rack slidably mounted on said carriage for feeding said paper, and means for moving said carriage beyond printing position and simultaneously moving said rack in the opposite direction for feeding said paper.

21. In a machine of the class described, the combination of a lever key; a record strip carriage adapted to be moved different extents; means operated by said lever key to move the carriage one extent; and a driving mechanism connected to said means to control the same to move the carriage a different extent.

22. In a machine of the class described, the combination of manipulative means; an adjustable record material carriage; a device pivoted to the carriage; means operated by the manipulative means and connected to said device to move the carriage a definite extent; and means connected to said device to move the same to adjust the carriage a different extent.

23. In a machine of the class described; the combination of a lever key; a record strip carriage adapted to be moved different extents; means connected to the carriage and operated by said lever key to move the carriage one extent; driving mechanism connected to said means to change the driving movement of said means to cause the carriage to move a different extent; a record strip receiving roll driving means; and means to operate said receiving roll driving means to one extent when the carriage is moved by the lever key, and to another extent when the carriage is moved a different extent.

24. In a machine of the class described, the combination of an adjustable record material carriage; a pivoted lever connected to the carriage; a lever key; means operated by the lever key to move the pivoted lever to adjust the carriage a definite extent; and means connected to said lever to move the lever to move the carriage a different extent.

In testimony whereof I affix my signature.

EDWARD J. VON PEIN.